US012667512B2

(12) United States Patent
Pardowitz

(10) Patent No.: US 12,667,512 B2
(45) Date of Patent: Jun. 30, 2026

(54) MOBILITY ASSISTANCE DEVICE

(71) Applicant: ROOWALK MOBILITY GMBH, Berlin (DE)

(72) Inventor: Benjamin Pardowitz, Berlin (DE)

(73) Assignee: ROOWALK MOBILITY GMBH, Berlin (DE)

( * ) Notice: Subject to any disclaimer, the term of this patent is extended or adjusted under 35 U.S.C. 154(b) by 371 days.

(21) Appl. No.: 18/279,126

(22) PCT Filed: Nov. 30, 2022

(86) PCT No.: PCT/EP2022/083799
§ 371 (c)(1),
(2) Date: Aug. 28, 2023

(87) PCT Pub. No.: WO2023/099538
PCT Pub. Date: Jun. 8, 2023

(65) Prior Publication Data

US 2024/0139058 A1 May 2, 2024

(30) Foreign Application Priority Data

Nov. 30, 2021 (EP) .................................... 21211278

(51) Int. Cl.
*A61H 3/04* (2006.01)
*A61H 3/00* (2006.01)

(52) U.S. Cl.
CPC ............... *A61H 3/04* (2013.01); *A61H 3/008* (2013.01); *A61H 2003/007* (2013.01); (Continued)

(58) Field of Classification Search
CPC .......... A61H 2003/04; A61H 2003/043; B62K 11/007
See application file for complete search history.

(56) References Cited

U.S. PATENT DOCUMENTS

2008/0164083 A1* 7/2008 Miki .................... B62K 11/007 180/165
2015/0102577 A1* 4/2015 Wenmakers ........... A61H 3/008 180/6.24
(Continued)

FOREIGN PATENT DOCUMENTS

DE 202008017221 U1 5/2010
FR 3067320 A1 * 12/2018 ......... A63B 69/0064
(Continued)

OTHER PUBLICATIONS

Translation of FR-3067320-A1 (Year: 2018).*
Int'l Search Report for PCT/EP2022/083799, dated Feb. 23, 2023.

*Primary Examiner* — Christopher B Wehrly
(74) *Attorney, Agent, or Firm* — MaxGoLaw PLLC

(57) ABSTRACT

A mobility assistance device includes a set of wheels connected to each other by a frame, a distal arm, a proximal arm and a first axis between the distal arm and the proximal arm wherein the distal and the proximal arms are pivotably arranged about the first axis and are operatively connected to the frame. A harness for receiving a user is provided on the proximal arm at a length L2 to the first axis. A counterweight is provided on a distal arm at a length L1 to the first axis. The counterweight and both of the lengths L1 and L2 are configured to at least partially compensate the weight of the user, characterized in that the mobility assistance device includes a control unit and comprises at least two self-balancing wheels, wherein the control unit is configured to control the self-balancing wheels in accordance with an inverse pendulum principle.

20 Claims, 10 Drawing Sheets

(52) U.S. Cl.
CPC .................. *A61H 2003/043* (2013.01); *A61H 2201/1623* (2013.01); *A61H 2201/1633* (2013.01)

(56) References Cited

U.S. PATENT DOCUMENTS

| | | | | |
|---|---|---|---|---|
| 2016/0346156 | A1* | 12/2016 | Walsh | A61H 3/008 |
| 2017/0128293 | A1* | 5/2017 | Tsusaka | A61G 7/10 |
| 2019/0255716 | A1* | 8/2019 | Neville | B25J 19/002 |
| 2022/0096295 | A1* | 3/2022 | Ang | A61H 3/008 |

FOREIGN PATENT DOCUMENTS

| | | | | |
|---|---|---|---|---|
| JP | 2011115323 | A | 6/2011 | |
| WO | 2010139936 | A1 | 12/2010 | |
| WO | WO-2020016358 | A1 * | 1/2020 | A61G 5/042 |

* cited by examiner

MOBILITY ASSISTANCE DEVICE

The invention relates to a mobility assistance device comprising self-balancing wheels connected via a frame to a seesaw assembly. The seesaw assembly is configured to receive a user at one end and comprises a counterweight at the other end, wherein the counterweight is configured to at least partially compensate the weight of the user. The self-balancing wheels are controlled independently of each other via a control unit according to an inverse-pendulum principle. The device can advantageously support a wide range of user postures and movements including walking, jumping and crawling. Furthermore, the control unit stabilizes the device and the user to enable safe mobility. In a further aspect the invention relates to a method of using such a device for assisting a user and propagating an intentional movement, while providing an at least partial body weight support.

BACKGROUND AND PRIOR ART

Mobility assistance devices are commonly used to assist persons who due to disability, injury, age or illness cannot maintain a normal posture, gait or walking speed. Examples of traditional mobility assistance devices include walking sticks, crutches, wheelchairs, walkers or walking frames such as Zimmer frames and the like. These typically rely heavily on the user's existing motor functions, for example in the upper body and specifically in the arms and hands, to drive them. In general, their use is restricted to adults or older children who already have sufficient strength and motor control to drive the device. Furthermore, they do not encourage normal walking patterns at normal speeds. These devices are particularly unsuitable for users where congenital or acquired neuromuscular diseases affect muscle strength, motor control, balance or posture in such a way that they are unable to stand and walk independently, who have generally weakened motor functions and for younger children, such as those with cerebral palsy, who cannot rely on their arms to drive a mobility assistance device.

Among users who require assistance with mobility, a large proportion are children with long-term or hereditary conditions. Other users include those who are elderly, frail, have suffered an injury or a stroke. There exists a large imbalance in the market which is mainly directed to such adult users or those who have experience in mobility before an injury took place. In the case of children, the special requirements of training them to improve their strength and balance are added to the general needs of all children to learn, explore and socialize as they grow. Regular and independent movements should ideally take place from early childhood in order to secure both physical and cognitive development opportunities in the long term. Furthermore, the needs and sizes of children tend to change quickly while they have generally reduced strength compared to older users. In particular in the case of cerebral palsy, depending on the severity of the condition, children may have lowered motor skills and strength but still enough for their movement intentions to be read and interpreted by an outside person. Around 1-4 out of every 1000 children are born with cerebral palsy.

To assist such persons with limited mobility in developing their muscle strength, motor control, balance and posture with a wide range of movement possibilities, a parent, therapist or assistant may partially lift them up and hold them straight by holding their waist or hips to prevent them from falling. At the same time, the arms and legs may be kept generally free such that the affected persons may develop better control and strength in their limbs. The assistant may observe and interpret the person's movement to support intentional movements such as a deliberate squatting to the ground while suppressing unwanted movements such as falls or spastic movements. This requires a high degree of reliance on the assistant and does not allow such persons to become independent and interact with their peers at eye level.

Especially in the case of children and teenagers, this can significantly affect the development of the user in other areas such as social skills. The need for constant assistance by another person not only reduces the user's sense of confidence but also limits their access to a variety of places and activities such as outdoor areas, schools, leisure facilities and the like. Often the child and/or the assistive device must be carried over a step or obstacle by the carer. The reliance on a carer, who is often a family member, may lead to overburdening the user's family environment. Thus by excessive reliance on others, the user not only does not develop physically but is also hindered from developing their own personality, interests and social relationships.

Devices have therefore been developed to perform the role of the assistant and allow improved mobility for users with reduced muscle strength overall, reduced motor functions and a tendency to become quickly exhausted.

As an example of such a device, DE 20 2008 017 221 U1 discloses a motorized mobility aid having a front portion for holding a user upright and a rear portion for providing an uplift force on the user, wherein the rear portion weighs more that the front portion. Between the front and rear portions, at least one motorized wheel is installed. The device can thus reduce exhaustion during activities such as walking uphill and skiing. However, the device is substantially configured for moving in one continuous direction and speed. DE 20 2008 017 221 U1 suggests adjusting the speed of the device using a control element such as a slider moved with a thumb. This may reduce the speed of the motorized movement to the wheels but not the inertia of the system. To turn, accelerate or decelerate the user must overcome the inertia of the device to bring about the desired change of movement.

It is therefore implicit that a high degree of motor skills is needed to control the device, especially in the user's upper body and their hands. As turning must be forced by the user, a high degree of strength is also required. The device of DE 20 2008 017 221 U1 also provides no assistance to a user in other changes of posture such as kneeling and getting back up. The device is therefore only suitable for users who have experience with normal walking and retain a high degree of strength and motor skills. For those who may never have walked independently before, such as small children, a greater degree of support for a wider range of movements is required.

As a further example, WO 2010/139936 A1 discloses a wheeled device comprising a load, wherein the load may itself be a battery driving the wheels. The device may stabilize the walking speed of a user due to the added inertia caused by the load. In use, if the user is pushing the device so that the device is in front of the user, then the device may produce a pulling force when the user slows down, and a pushing force when the user begins to accelerate. Depending on the position of the load, the effective weight of the user may be altered. It is important to highlight here that the device is still mainly driven and controlled by the user who is described as being a frail elderly person for example.

In a particular embodiment of WO 2010/139936 shown in FIG. 10, the device comprises a hinge extending from a distal end of the device, close to the wheels. The hinge comprises a load which functions as a counterweight to reduce the effective weight of the user. Although the user may hold the proximal end of the device with their hands, an alternative is the use of a belt or the like to attach the device to the user, leaving the hands free. The device may thus provide some relief and assistance to a frail user. In a further embodiment illustrated in FIG. 4, WO 2010/139936 A1 discloses a speed controller for the user to set a desired walking speed. The user must pay attention while walking to safely control the speed themselves. Apart from the need for user intervention in the control unit, the device still relies heavily on the user's own balance and motor functions. The device cannot, for example, assist the user in turning—this must be done by overcoming the inertia caused by the load. If the user chooses to crouch down, for example to pick up an object from the floor, the angle at which the load is raised to would cause the device to stop supporting the user. The device also has no control system able to distinguish between crouching and falling and therefore is only suited to users with a reasonable degree of balance and good motor functions.

Devices have also been developed to both reduce the effective weight of the user and prevent falling for those with reduced motor skills. As an example, the "Hibbot" walking aid by Made for Movement is a passive (not motorized) device equipped with a set of rods arranged in an A-shaped frame between which a hip-supporting belt is provided at a height corresponding to a standing position. The belt is connected by pneumatic or spring-loaded arms to the frame. The belt supports the user's hips and replaces the assistant's hands in the case of training a child to walk. The rods prevent the whole device from tipping forwards and provide a stable base, as well as preventing falling as the belt may be clipped directly onto the rods. The device is also equipped with a pair of parallel wheels arranged to follow the user from behind and a counterweight arranged behind the wheels on an arm extending from and pivoting about the wheel axis. The counterweight reduces the effective weight of the user, allowing those with weaker muscle tone to stand upright and walk. Due to the frame arrangement, this device provides a higher degree of safety to those with limited balance and mobility. The device also allows users, typically children with cerebral palsy, to interact with peers at eye level and take part in activities such as eating and playing due to the hands and feet being kept free.

Similarly to WO 2010/139936 A1 however, the angle of the arm carrying the counterweight and its low height from the ground also limit the support provided by this device. If the user were to squat, the counterweight would not provide enough support to lift them up again. An assisting adult would be required in case this occurred. When the belt is clipped to the rods, the user can no longer crouch or tiptoe as the height of their hips is effectively fixed within a narrow range. The device provides no active assistance for the user to move forwards, backwards or to turn left or right and therefore, despite its better safety, is limited in the range of movements it can support.

Furthermore, due to the lack of motorized support in the "Hibbot" walking aid, the user must at least partially carry their own weight as well as that of the device. With their own weight being partially supported by the device, the ground reaction to the effective body weight of the user is lowered. This decreases the horizontal force of the foot against the ground. With an increased weight to be pulled by the user and a lowered grip on the ground, a risk of sliding occurs. The need to pull the weight of the device can also become a particular hindrance when moving over uneven ground or attempting to overcome minor obstacles. When walking uphill, the user needs assistance from another adult to maintain their walking speed and prevent exhaustion. When walking downhill, the user needs the adult's assistance to safely come to a halt.

When children are using such a device, they must additionally be heavily supervised with frequent active intervention from an adult. The limited range of movement a child can make without help from an adult prevents the child from exploring their surroundings effectively such as lifting objects from the ground or reaching upwards. Therefore there remains a heavy strain on others.

To provide a greater degree of assistance to users, motorized devices have also been developed. An example is JP 2011115323 A which discloses a walking assistance robot for training a user, wherein the robot comprises a main body carried by a set of four wheels which follow the user from behind. An arm extends from the main body of the robot with an attachment belt for a user's hips. The belt and the robot are fitted with a plethora of sensors configured to either support or assist the movement of a user to promote a normal gait. To do this, the positions and motions of virtually all of the user's limbs are monitored and interpreted. The wheels of the robot are also motorized and controlled using feedback from the sensors. The robot is configured to move the arm and the user upwards when the sensors detect motions consistent with falling.

The size of the robot is however large, resulting in a large turning circle which is not compatible with use in everyday environments. Furthermore, the robot is configured for supporting a user when training to walk only. Other movement types are not foreseen. Due to the size of the robot and the arrangement of the four wheels, it would be impossible for the user to overcome small obstacles on the ground, a threshold or set of stairs with the robot. It is therefore only suited for use in controlled environments such as hospitals or rehabilitation centers. Though it may relieve some of the burden on an assistant, significant supervision is still required.

In light of the teachings of the prior there is room for improvement for providing a mobility assistance device which can adequately support a variety of up/down movements such as standing, jumping and squatting as well as supporting turning movements. Regular and independent movements should ideally take place from early childhood in order to secure both physical and cognitive development opportunities in the long term. In particular, the devices of the prior art typically still require an assistant to lift the user in case of squatting down to the ground, to help them change direction and/or to overcome an obstacle. This means that if a building such as a museum, cinema, sports centre or the like must be accessed by overcoming even one or two steps, the user of the device is effectively excluded due to the burden of overcoming the steps with a heavy device. Thus a great degree of independence cannot be provided.

In light of these difficulties, there exists a pressing need for improved mobility assistance devices which can support users, especially children with long-term conditions, in a wide range of activities without the need for close supervision or assistance.

SUMMARY OF THE INVENTION

An objective of the present invention was to overcome the disadvantages of the prior art and to provide an improved mobility assistance device which supports a wide range of postures and movements and is preferably adapted for use with children.

The problem is solved by the features of the independent claims. Preferred embodiments of the present invention are provided by the dependent claims.

The invention relates to a mobility assistance device comprising:

a set of wheels connected to each other by a frame,
a distal arm,
a proximal arm and
a first axis between the distal arm and the proximal arm
wherein the distal and the proximal arms are pivotably arranged about the first axis and are operatively connected to the frame,
wherein a harness for receiving a user is provided on the proximal arm at a length $L_2$ to the first axis,
wherein a counterweight is provided on a distal arm at a length $L_1$ to the first axis and wherein the counterweight and both of the lengths $L_1$ and $L_2$ are configured to at least partially compensate the weight of the user,
wherein the mobility assistance device further comprises a control unit and the set of wheels comprises at least two self-balancing wheels,
wherein the control unit is configured to control the self-balancing wheels in accordance with an inverse pendulum principle.

For the purposes of this invention, a "seesaw" is preferably a first-class lever supported at a single fulcrum provided between two beam portions which may or may not be aligned with each other. The beam portions are each configured to carry a load. In this case, the first axis is the fulcrum and the proximal and distal arms are the beam portions. The loads comprise the counterweight and the harness carrying the user.

For the purposes of this invention, a "harness" is preferably any means for securing and/or supporting a user to a device. This may include a seat, a belt, a set of straps, a rucksack-type arrangement, a wearable piece of clothing, an exoskeleton or the like.

For the purposes of the invention, a "compensation of the weight of the user" preferably means providing an upward force acting on the centre of gravity of the user in a direction opposite to their weight force. This upward force is often referred to as the uplift force. The term "compensation of the weight of the user" is also used interchangeably in relation to this invention with the term "partial body weight support", For the purposes of the invention, a "set of wheels" comprises any number of wheels including at least two self-balancing wheels but may further include other wheels such as support wheels, suspension wheels and the like which may or may not rotate about the second axis.

The vertical axis z may be defined as being in the direction of gravity. This is also referred to herein as an up-down direction or a vertical direction. The x axis may be defined as being in the direction in which a user walks. This is also referred to in herein as a forward-backward direction. The y axis may be defined as the longitudinal direction of the second axis about which the two self-balancing wheels rotate. This is also referred to herein as a left-right direction or a sideways direction.

For the purposes of this invention, a "self-balancing wheel" preferably functions as a wheeled inverted pendulum system. An example of such a system is known from the Segway patent U.S. Pat. No. 6,302,230B1.

In the present invention, each self-balancing wheel is preferably equipped with its own motor and its own set of sensors. Preferably each self-balancing wheel comprises its own controller which drives the motor on the basis of sensed data from the set of sensors. The center of gravity of a weight carried by each self-balancing wheel can be theoretically modelled as an inverted pendulum. In a wheeled inverted pendulum system, the speed, acceleration and direction of rotation of a motorized wheel are preferably controlled such as to prevent a pendulum extending vertically upwards from the wheel axis from tilting, swinging down and falling. When the pendulum is in a vertical position above the wheel axis, the wheeled inverted pendulum system is balanced. This vertical position is referred to as an unstable equilibrium position. This becomes a target position which the system aims to return to in case of any deviation of the pendulum's orientation.

A pendulum may begin tilting and falling ahead of or behind the wheel in an x-plane. The x-plane is preferably defined as spanning the x- and z-axes. The angle between the pendulum, the wheel's center and the vertical position in the x-plane is preferably detected by the set of sensors. The wheel drives in the direction in which the pendulum is tilting and falling, to prevent the fall and to bring the orientation of the pendulum back towards the vertical position.

In this case, the weight of the pendulum may comprise at least partially the weight of the self-balancing wheel itself, the weight of the frame and seesaw and the weight of the user. The user usually maintains contact with the ground separately from the wheels, wherein usually at least half of a user's foot is on the ground such that the user can intentionally influence the orientation of the pendulum. Furthermore, due to the contact with the ground, usually only a part of the user's weight contributes to the weight of the hypothetical inverted pendulum.

Preferably the self-balancing wheels can be controlled independently of each other in accordance with an inverse pendulum principle. As used herein the term "independent regulation of each of the self-balancing wheels according to an inverse pendulum principle" preferably means that each self-balancing wheel preferably functions as an independent wheeled inverted pendulum system. Additional overarching control methods and co-ordination between the wheels is hereby not excluded. Hence, the angular position of a falling pendulum in the x-plane is preferably detected by a set of sensors for each wheel and each wheel drives in the necessary direction and at the necessary speed to return the pendulum to the vertical position as described above.

Preferably the frame of the device is so configured that the angular position of the pendulum in the x-plane above each self-balancing wheel is varied when the user shifts their center of gravity laterally, i.e. in the y-plane. To achieve this, a frame carrying the seesaw may extend substantially upwards from a centre of rotation of each self-balancing wheel. An angle θ of the upwardly extending member of the frame from the vertical position may preferably be varied in the x-plane. Preferably the frame is so configured that the angle θ of an upwardly extending member of the frame may vary independently between one lateral side of the device and the other, such that the orientation of the pendulum in the x-plane may be different with respect to each self-balancing wheel. Each self-balancing wheel may then be actuated independently of the other to return the pendulum to its vertical position. Preferably, the direction in which the user turns laterally effects a smaller deviation in the angle θ of the frame member connected to the wheel positioned in the direction of the turn. A wheel on the other side of the user preferably has a larger angle θ to balance out. The self-balancing wheel having the lower angle θ preferably rotates more slowly in a forward direction or moves in a backward direction compared to the self-balancing wheel with the larger angle θ.

When two such self-balancing wheels are used in conjunction with one another, a turning action is preferably effected by a difference in speed or direction between the two wheels. The centers of the axes of rotation of the two self-balancing wheels are preferably kept equidistant by a frame joining them together. The radius of turning is thus preferably approximately zero.

Advantageously for the mobility device according to the invention, each self-balancing wheel may be provided as an off-the-shelf item. It may be preferable, as is typically the case with off-the-shelf self-balancing wheels, that each self-balancing wheel comprises its own set of sensors and its own processor housed within the wheel or within a wheel casing. Each wheel may also comprise a motor. Each processor may control the motor of the respective wheel according to the inverse pendulum principle, independently of the other wheel. The self-balancing wheels may alternatively be provided custom-designed, wherein either separate processors are provided for each wheel or a common processor allows for an independent regulation of each of the self-balancing wheels in accordance with an inverse pendulum principle. Additional or alternative processors may be used to provide the self-balancing wheels with some degree of dependence and/or to co-ordinate movement between them.

In the sense of the invention, a "control unit" preferably comprises one or more processors for regulating each of the self-balancing wheels based upon the data from sensors provided in said wheels in accordance with an inverse pendulum principle. Preferably, the control unit may comprise a first processor for a first self-balancing wheel and a second processor for a second self-balancing wheel, wherein each of the first and second processors preferably receives data from the set of sensors pertaining to the respective wheel, uses the sensed data to determine a corrective action required to maintain stability of the device and commands one or more wheel-motors to make the corrective action.

Preferably, the control unit may comprise a third processor configured to monitor the processors of each self-balancing wheel and to coordinate a corrective action between them. The third processor may preferably be configured to receive data from further sensors outside of the wheels and/or to command other actuators apart from the wheel motors to perform a command selected based on sensed data. Preferably, the third processor may be configured to detect a failure of one or both first and second processors and to bring the device safely to a stop if a failure is detected. The third processor may additionally or alternatively be configured to detect the speed of each self-balancing wheel, to compare the speeds of the self-balancing wheels and to limit a speed difference between them. This is especially useful to prevent accidents on slippery surfaces where one wheel fails to acquire sufficient traction, or to prevent accidents where one wheel is stuck. Alternatively, the control unit may only comprise a single processor that may control both self-balancing wheels independently in accordance with an inverse pendulum principle and co-ordinate a corrective action between them, if necessary.

In the sense of the invention, an "actuator" is preferably a device which performs a movement in response to a signal from a control unit and/or in response to a sensor reading. Movement of the actuator is preferably powered by an electric current, hydraulic pressure, or pneumatic pressure. It may be preferable for the actuator to be a motor such as a rotary motor or a linear motor. As a non-limiting example, each self-balancing wheel may be driven by a rotary motor, in particular an electrically-driven rotary motor. As a further non-limiting example, adjustment of the position of the counterweight may be effected by a pneumatic or hydraulic actuator, in particular a telescopic cylinder.

The invention supports upward and downward movements of the user by means of the counterweight. The first axis allows the distal arm carrying the counterweight and the proximal arm carrying the user to function as a seesaw, lifting the user up or allowing them to lower themselves down intuitively. The harness partially lifted by the counterweight notably allows the user's hands to remain free and does not require a strong upper body with skilled arms and hands. In particular, the user does not need to use their hands to control the device in contrast to known devices. By freeing the user's hands, the user is free to take part in daily activities. This is especially important for children who need to learn and socialize by playing.

The harness is preferably configured to be forward-facing. That is, the user may be secured to the harness with the remainder of the device substantially behind them. An advantage of using a harness is that it can secure the user to the machine in a manner that is space-saving and compact, such that they can face their peers without a perceived physical "barrier". This is in contrast to known devices, in which the plethora of sensors are arranged in and around a large inflexible carrying arm for receiving the user. Furthermore, the use of a harness allows the device to be simply adaptable to the growth of a child as harness straps may be loosened or tightened as appropriate. Harnesses are easily replaced or adapted to changing requirements and due to their flexibility and variety can allow a wide range of unrestricted movement. This is especially important for children who often play with objects on the floor or crouch and/or crawl.

Due to the reduced strength, motor control, balance and posture control of children and those with weakened muscles, the reduction of the effective weight of the user significantly reduces the burden on their muscles. This allows the user to stay upright for much longer before exhaustion sets in. The user can thus take part in activities for longer, developing their experience of the world and improving their quality of life. The counterweight operates passively, that is, it does not require an active robotic lifting of the user. This also reduces the burden on the electrically powered components of the device such that the device may be used wirelessly for longer, e.g. outdoors, before being charged. This further opens wider opportunities for users to travel and share experiences with others.

The separation of the balance functions between the counterweight and the wheels also allows for a greater modularity whereby different parts of the device may be replaced as the user's needs develop. Preferably, any one or more of the harness, the counterweight, the self-balancing wheels and the support wheels are configured to be removable and replaceable by an adult without the need for specialist tools. The replaceable parts may preferably be securable to the frame or to the seesaw by means of Allen keys for example. This further improves the modularity and longevity of the device. Preferably, the positions of the counterweight and/or the support wheels with respect to the seesaw or the frame are also manually adjustable by an adult without the need for specialist tools.

The self-balancing wheels provide a further compact way to carry the frame including the harness in a forwards-backwards and left-right direction. As such, the device may assist the user not only by reducing their effective weight but by maintaining their balance regardless of the direction they walk in. The force required to move the device which includes the weight of the wheels, frame, arms and counterweight is kept minimal since the user need only move the pendulum out of an unstable equilibrium position to make the device move. The sensitivity of the device can be set such that this movement is minimal. The strength required to move forwards and backwards as well as to turn is thus reduced and kept safe by the device. As such, the active assistance of another person is no longer required, especially for turning.

The inverse pendulum principle used to control the self-balancing wheels provides a simple alternative to the more complex motorized solutions of the prior art. Balance can thus be achieved without requiring a great number of sensors for the various limbs. By using two self-balancing wheels, the size of the device may be reduced whilst maintaining a high degree of stability and at the same time exceeding in maneuverability. It is thus not necessary to increase the size of the device to four wheels which would lead to increasing the turning circle.

Furthermore, in the case of uneven ground—as is often found outdoors—using two self-balancing wheels provide an advantage over the prior art as they react quickly and automatically to sudden shifts in the user's center of gravity. As such, challenging terrains are also accommodated by the device. As the device does not require more than two self-balancing wheels, climbing stairs and overcoming obstacles and thresholds or the like is also facilitated.

It is preferable that the harness is configured for the user to face away from the device. As such, the wheels and counterweight follow the user from behind, allowing them more freedom to see ahead of them, to perform activities with their hands and feet and to interact with others without physical barriers.

In a preferred embodiment of the invention, the first axis is arranged at a height $h_0$ from the ground. The height $h_0$ is preferably between 0.6 and 1.2 m in the case of an adult. The height $h_0$ is preferably between 0.3 and 0.9 m in the case of a child. By arranging the first axis at a height $h_0$ from the ground, sufficient space is provided for rotation of the distal arm about the first axis without conflicts with the ground and/or lower parts of the frame. The height further provides space below the arm arrangement which allows an angle between the proximal and distal arms to be optimized.

The at least two self-balancing wheels are preferably configured to rotate about a second axis arranged at a height less than $h_0$ from the ground. Preferably the height of the second axis from the ground is between 0.05 and 0.4 m. The height of the second axis from the ground may depend on the size of an end user. Preferably, this height is between 0.05-0.2 m for a toddler or young child aged between 2-5 years, between 0.1-0.3 m for a child aged between 6-14 years and between 0.2-0.4 m for a teenager or adult aged 15 or over. The lower position of the wheel axis provides for a more stable base whereas the higher position of the first axis advantageously allows the distal arm to be made longer without conflicts with the ground or other parts when rotating. By extending the length $L_1$ of the distal arm, the moment applied by the same weight may be made greater. As such, more support may be provided to reduce the effective weight of the user without adding to the weight of the device as a whole.

Preferably the lengths $L_1$ and $L_2$ are approximations of the effective beam portion lengths of the seesaw. Theoretically, the length of the distal beam portion may be defined as the distance between the centre of gravity of the counterweight and the fulcrum (that is, the first axis). The theoretical length of the proximal beam portion may be defined as the distance between the centre of gravity of a user in the harness and the fulcrum respectively. Depending on the configuration of the harness and the way in which it is coupled to the proximal arm, it may not be the case that the length of the proximal arm corresponds exactly to the length of the theoretical proximal beam as the arm may stop short of the centre of gravity of the user. It is also possible that the proximal and/or distal arms do not extend in a straight line to the first axis. They may for example be non-linear or articulated. It is preferred that the length $L_1$ of the distal arm is the distance between the first axis and the point at which the arm is coupled to the counterweight. It is preferred that the length $L_2$ of the proximal arm is the distance between the first axis and the point at which the second arm is coupled to the harness. It should preferably be taken into account when setting the arm lengths $L_1$ and $L_2$ that the centre of gravity of a user varies with age, biological sex and development. Young children (2-5 years) tend to have centres of gravity around the height of their navel whereas adults tend to have centres of gravity in the pelvis.

A height difference $\Delta h$ between the first and second axes influences the theoretical lever length and the pendulum moment acting on the self-balancing wheels. Increasing $\Delta h$ increases the level of movement support in the forward direction. That is, the greater the height $\Delta h$ and the distance of the forward shift, the longer the theoretical lever formed by the pendulum and the greater the moment acting about the second axis. Each self-balancing wheel moves forwards or backwards to balance out respectively a positive or negative angle $\theta$ of the pendulum from the vertical which is detected by the set of sensors. Lower forces are thus required to move the whole device forwards. It is preferred that $\Delta h$ is between 0.25-1 m, more preferably between 0.3-0.6 m.

It is particularly preferable that $h_0$ is at or above the height of a user's centre of gravity when standing. It has been found that this results in a more intuitive and natural movement of the user. Such an arrangement also results in a more compact device.

In a further preferred embodiment of the invention, $h_0$ is greater than the length of $L_1$. This provides maximum space for the rotation of the distal arm about the first axis to create the required moments. The distal arm may as such be virtually vertical with the counterweight applying no moment at all when the user's centre of gravity is at a maximum height, such as when standing on tiptoes or jumping. The distal arm may also reach a virtually horizontal position when the centre of gravity of the user is as low as possible, leading to the counterweight applying the maximum moment to support the user in getting back up.

In a further preferred embodiment of the invention, $h_0$ is also greater than the length of $L_2$. The proximal arm may thus rotate over a wide range of positions while preventing falling and critically protecting the user's hips from landing on the ground. In the lowest position, a user may squat or crawl while being supported by the counterweight in getting back up. Additionally, as explained further below, a spring-loaded element, for example in a suspension wheel, may assist the user in getting back up from a low position.

The height $h_0$ is preferably adjustable. This may be achieved via a telescopic and/or pneumatic connection between the first axis and the frame. Preferably the frame is configured to increase $h_0$ by at least 10 cm, more preferably by at least 25 cm from a minimum height. The height may preferably be adjusted depending on the user's size such that the first axis remains at the same level or higher than the centre of gravity of the user. The lengths $L_1$ and $L_2$ may also be adjustable. The arms may comprise telescopically and/or pneumatically extendable portions. Preferably the arms are configured such that $L_1$ and $L_2$ are extendable by at least 10 cm, more preferably at least 25 cm. The position of the counterweight along the distal arm may also be adjusted manually or automatically to reduce or increase the level of support. Automatic adjustment of the position of the counterweight along the distal arm may be effected by an actuator and may preferably be configured to adjust the bodyweight support provided to the user in real time. This may be adjusted for example in relation to the user's position at a given moment. As a mere example, the actuator may be an electric, hydraulic or pneumatic telescopic actuator. The support required by a user may also vary over the course of a day, for example due to exhaustion setting in. Preferably this can be compensated for by the control system causing the actuator to move the counterweight further away from the first axis to increase body weight support.

The counterweight may preferably comprise a battery. Preferably the counterweight is configured to be replaceable and/or the distal arm is configured to have additional counterweights installed on it. The same device is thus adaptable for use by users of different sizes. This is especially advantageous in the case of children who may use the same device over the course of several years, during which their size, strength and motor skills may develop. This is also advantageous for users undergoing rehabilitation after an accident or illness, for example after an amputation. Over the course of the rehabilitation, the user's support needs may be reduced. This may be accommodated by removing excess counterweights from the device.

In a further preferred embodiment of the invention, the position of the first axis is shifted forwards in the direction of a user with respect to the second axis. Preferably the forward shift is between 0.2-6 cm, preferably 0.5-3 cm. Preferably the position of the first axis in the x-direction is configured to be adjustable such that it can be manually or automatically increased by at least 1 cm from a default position. Preferably a default forward shift is 2 cm in the x direction. By positioning the first axis not directly above the second axis but closer to the user, the centre of gravity of the device is shifted forwards. This is detected by the control unit of the self-balancing wheels, which attempts to compensate for the shift by moving forwards to bring the wheels directly under the centre of gravity of the pendulum. Preferably the forward shifted position of the first axis with respect to the second axis results in a default angle $\theta$ between an actual and an equilibrium position of the theoretical pendulum. The self-balancing wheels attempt to cancel out this angle $\theta$ by moving forwards. The device is thus generally biased towards forward motion, mimicking natural gait. This is especially advantageous in the case of children who tend towards inconsistent movement when their intention is to move forward. This may include spastic backward movements which due to the shifted position of the axes would not to be amplified. The shift between the axes is preferably adjustable, for example by means of an excenter or a slot in which the first axis is housed and fixed in a defined position.

Preferably, the angle between the proximal arm and the distal arm is fixed during use. This angle may be manually or automatically adjustable, e.g. to support different users of different sizes as well as changing the characteristics of the induced uplift force. In a preferred embodiment of the invention, the angular position of one or both of the proximal and distal arms is detected by an angular position sensor in the seesaw or by other types of sensors directly attached to one or both of the arms. This may be fed back to the control unit. In a further preferred embodiment of the invention, the seesaw may comprise a telescopic arc portion connecting the distal and proximal arms together such that the angle between them is adjustable. Preferably this telescopic portion is spring loaded with dampening elements to for example balance out abrupt movements enabling natural harmonic gait patterns.

In a further preferred embodiment of the invention, a ground-facing angle $\alpha$ formed between the distal and proximal arms is equal to or less than 180°, preferably between 90°-180°, more preferably between 110°-140°. Therefore, in a default position, preferably corresponding to a standing or walking position of the user, the distal arm tends to point downwards towards the ground. That is, a default ground-facing angle between the distal arm and the vertical is acute. This is in contrast to the known devices in which the distal arm tends to point away from the ground in the default upright position of the user. Advantageously, by fixing an angle $\alpha$ between the distal and proximal arms to be between 90°-180°, the support provided by the counterweight may be maximized where needed, for example when the user crouches down to the ground. If the smallest angle $\alpha$ of 90° is chosen, the lowest position would result in an approximately vertical proximal arm and an approximately horizontal distal arm. At the horizontal position, the full weight of the counterweight acts orthogonally to the distal arm resulting in the maximum possible moment. This provides the user with maximum assistance in getting up. At the upright position of the user, assuming the height of the first axis is approximately level with the user's waist, the distal arm is close to being vertical. Only a very small component of the weight of the counterweight would then act orthogonally to the distal arm, resulting in a very low moment. The uplift force applied to the user is thus minimized when the user is already upright. At the same time, this arrangement allows for a high degree of space saving as the device may be kept compact.

When the greatest angle $\alpha$ of 180° is chosen, the whole length of the device becomes longer, spanning at least the sum of $L_1$ and $L_2$. The greatest uplift force would be provided when the user is in an upright position and the proximal and distal arms are approximately horizontal. A small variation in user height would also have a lower impact on the uplift force applied.

By analyzing various case studies, it was found that the angle $\alpha$ was most effective when set between 110°-140°, particularly preferably between 120°-130°. This will be explained below in more detail in light of the figures. It was found that in this range of angles, the size of the device could be made adequately compact while providing a stable uplift force which reacts sensitively enough to small height variations in the user. As such the user may be supported at all heights for all possible postures and movement types, including lifting the user from the ground. This eliminates to a large extent the role of the assistant required for lifting up the user as is the case in much of the prior art.

In a further preferred embodiment of the invention, the device is configured such that, when the user is in a standing position, an angle $\alpha_1$ between the distal arm and a vertical is between 45°-130°, an angle $\alpha_2$ between the proximal arm and the vertical is 45°-130°, wherein the sum a of $\alpha_1$ and $\alpha_2$ is not more than 180°. The height $h_0$ of the first axis is preferably set accordingly to allow unhindered rotation of both arms of the seesaw about the first axis. This provides for a compact device with a relatively small turning circle whilst maintaining an adequate uplift force from the seesaw. It is also advantageous that such angles allow the user free space behind their head and arms, allowing for unrestricted and natural movement.

In a further preferred embodiment of the invention, the device is configured such that the length $L_2$ is greater than the length $L_1$, wherein preferably $L_1$ is between 0.2-0.6 m, preferably 0.3-0.5, more preferably 0.35-0.45 m and $L_2$ is between 0.25 and 0.75, preferably 0.3-0.6 m, more preferably between 0.45-0.5 m. This was found to be particularly effective in reducing the effective weight of the user as the moment induced by the counterweight is increased relative to an opposing moment induced by the user's weight. A compact device is also achieved by these dimensions.

In a further preferred embodiment of the invention, the device further comprises a support wheel connected in a spring-loaded fashion below the proximal arm, the distal arm or the frame and configured to prevent the harness from uncontrolled falling during use. The spring-loading may be achieved mechanically via an element of a compression spring, tension spring, torsion spring, hydraulically or pneumatically. The support wheel may be a wheel suspended by a telescopic spring-loaded rod from the proximal arm, also referred to here as the suspension, such that the wheel would reach the ground before the harness if the proximal arm were to reach its lowermost angle. The wheel and suspension would not cause the user to stop abruptly as in the case of rods seen in the prior art but would soften their landing. The length of the suspension and its position along the proximal arm may be configured to set a lowermost position for the user. The length of the suspension is preferably between 5-40 cm, more preferably between 10-20 cm.

Alternatively or additionally, a wheel may be suspended in similar fashion from the distal arm to define a maximum upward position of the user. This may also be spring-loaded to avoid abrupt stopping of the user, e.g. while jumping upwards. A variety of other exemplary configurations of the support wheels are shown in the figures and described later on.

In a further preferred embodiment of the invention, the support wheel is positioned to allow the user to vary their height within a range corresponding to standing on tiptoes, walking, crouching and/or crawling. Advantageously, this allows the user maximum freedom and independence when using the device which only limits movements which are considered unsafe for the particular user. Preferably, the position of the support wheel is adjustable. The skilled person is aware of suitable means for attaching support wheels to the device such that their positions are adjustable. Such means may include telescopic bars fixed relative to each other by one or more bolts which can be inserted through a number of bore holes, slots or notches. This allows the device to grow with the user instead of being replaced.

In a further preferred embodiment of the invention, the counterweight has a mass between 5-30 kg preferably between 5-20 kg, more preferably between 8-12 kg, even more preferably around 10 kg. Particularly with a length $L_1$ of between 0.35-0.45 m, this weight provided an advantageous reduction in the effective weight of the user, especially in the case of a child.

In a further preferred embodiment of the invention, the position of the counterweight on the distal arm is automatically variable, such that $L_1$ may be varied. To this end the device may comprise an actuator for varying the position of the counterweight on the distal arm. For instance, the control unit may adjust the position of the counterweight, e.g. by sliding it along the distal arm by means of an actuator (electrical, pneumatic etc.), in accordance with a perceived intention of the user. For example, if sensors in the device detect that the user does not attempt to lift themselves up from a crouching position, the control unit may be configured to move the counterweight closer to the first axis to reduce the uplift force on the user, allowing them to continue to move according to their intention of remaining crouched. The counterweight may be moved further from the first axis to increase the moment applied to lift the user up if it is detected that they are reaching upwards, for example by tiptoeing or raising their arms.

In a further preferred embodiment of the invention, the at least two self-balancing wheels are negatively cambered at an angle between 5°-20°. In the sense of the present invention, a "negative camber" is preferably a setting of the wheels of the device to be closer together in the y-direction at the top than at the bottom. A "negative camber angle" β is preferably an angle between a center line passing from the top to the bottom of a wheel in the y-plane and the ground, wherein the angle faces the center of the device. Preferably the camber angle β is about 10°. This provides the device with a more stable shape having a wider base. Sideway tipping of the device is made virtually impossible by the cambering resulting in added safety in the case of uneven ground conditions and/or rough play with other children.

Terms such as substantially, approximately, about, etc. preferably describe a tolerance range of less than ±20%, preferably less than ±10%, especially preferably less than ±5%, and especially less than ±1%, and include the exact value.

In a further preferred embodiment of the invention, the frame is arranged on the outer sides of the wheels, leaving a gap between the wheels free. For example, the wheels may be connected to each other by a frame extending outwards from the centre of each wheel, defining the second axis. The frame may then also extend upwards and inwards towards the first axis. Such a frame may advantageously be used to carry the device. The space between the wheels is advantageously kept free for unrestricted movement of the seesaw and thereby of the user such as when running or crawling.

The frame may have a variety of configurations. Regardless of the particular configuration, it is preferable that the frame connects the at least two self-balancing wheels together such that their distance in the y direction is kept preferably equidistant as well as that the frame is tiltable about the second axis.

It is also preferable that the frame supports left and right turning of the seesaw with respect to the wheel axis, preferably by means of ball joints. Preferably the frame is configured to accommodate a different magnitude and direction of an angle θ between each of a left and right member of the frame and a vertical. The left and right members of the frame preferably each extend substantially upwardly from a center of rotation of a respective self-balancing wheel. The left and right members of the frame are preferably coupled by a suitable articulation to a transverse member of the frame which houses the first axis. It is especially preferable that the left and right members of the frame are coupled to the transverse member by means of ball joints. Preferably the ball joints comprise a slot to accommodate a change in the distance between upper extremes of the left and right members when the angles θ diverge from zero or from the default. That is, the transverse member may be slightly oversized for a default position of the frame where the left and right members extend vertically from the centers of rotation of the wheels. The oversized ends of the transverse member may thus advantageously be stored in the slot in the ball joint. When the user begins to turn left for example, the top of the left member of the frame may move backwards creating a negative angle to the vertical while the top of the right member of the frame moves forwards creating a positive angle to the vertical. The transverse member must thus span a longer distance between these two ends and the lengths of the transverse member housed in the slot are reduced. Preferably the difference in length is very slight, being no more than 3 mm for example.

Preferably the joints in the frame are configured to provide a pre-determined degree of resistance to movements leading to left and right turning. This may be effected pneumatically or mechanically. Preferably the resistance is adjustable manually or automatically by means of an actuator regulated by the control unit. This may advantageously reduce the sensitivity of the device such that involuntary movements in some users do not lead to unintentional turning.

Preferably the joints in the frame are configured to accommodate the optional negative cambering of the wheels. Ball joints have been found particularly suitable for this purpose.

In a further preferred embodiment of the invention, the harness is arranged pivotably with respect to the proximal arm, wherein a shock absorber is preferably provided between the harness and the proximal arm. The skilled person is aware of means for arranging the harness pivotably with respect to the proximal arm. Examples of such means may include a hinge. The hinge may enable pivoting about a single axis, preferably the y-axis. A pivotable connection between the harness and the proximal arm allows the user to increase their range of unrestricted mobility as the angle of their hips or waist must not be kept constant with respect to the proximal arm. More natural movement patterns may thus be achieved. By providing a shock absorber between the harness and the proximal arm, for example a rubber, compressible hydraulic component, compressible pneumatic component or a compression, tension or torsion spring, a voluntary or involuntary backwards movement of the user's torso would not be abruptly stopped by the proximal arm.

In a further preferred embodiment of the invention, the control unit is configured to interpret a force applied by the user and to command the motors and/or actuators to suppress a force falling below a threshold force and/or applied for less than a threshold duration, wherein the threshold force and/or duration correspond to an involuntary movement. The control unit may thus be configured to filter out movements considered involuntary and not amplify these. This may be achieved by inputting data from various sensors to the control unit, for example data referring to conditions and positions of the user, movements of the seesaw or location of the frame, and/or data from the sensors of the self-balancing wheels. An algorithm may be used to interpret the sensed data, for example to filter and classify the sensed data. The control unit may be configured to send a command to one or more motors and/or actuators such as the motors of the self-balancing wheels, an actuator controlling the position of the counterweight, an angle between the distal and proximal arms of the seesaw, a stiffness in the ball joints and/or a stiffness of the suspension to move in accordance with the user's intention. Involuntary movements may be absorbed by the mechanical components of the device to avoid harsh stops. The control unit may advantageously only support the movements of the user which are considered to correspond with a particular intention so that the device moves the user further according to their intention. The user may rely less on their own muscle tone and exhaustion can be reduced.

In addition, the control unit may adapt electro-mechanical elements in such a way that this affects and changes intentionally the stiffness/resistance related to tilting the self-balancing wheels around the second axis. The control unit further may adapt the sensitivity of the sensors, and reaction times of the actuator elements including the self-balancing wheels.

In a further preferred embodiment of the invention, the control unit is configured to determine the position of the proximal and/or distal arms with respect to the vertical on the basis of data from one or more sensors and in response to the sensed data, to either suppress or propagate the movement of a user by adjusting the position of the counterweight, adjusting the speed and/or direction of the self-balancing wheels, and/or adjusting the stiffness of a connector between the support wheel and the frame. Advantageously, the control unit may support the user's movements in all directions whilst ignoring or counteracting signals interpreted as involuntary movements. An algorithm may be used to interpret the sensed data to determine whether a user's movement is classified as voluntary or involuntary. The control unit may preferably be programmed to store data corresponding to the user's movement patterns and learn which movements tend to be intentional for a particular user.

In a further preferred embodiment of the invention, the control unit is configured to interpret sensed data to determine whether a user's movement is voluntary and to propagate only voluntary movements, wherein the degree of propagation and/or suppression of the user's movement is preferably adjustable. By adjusting the degree of intervention, the user may be supported only as necessary for their particular case. Excess exhaustion may thus be avoided while allowing the user to safely practice exercising their own muscles and/or motor control.

As used herein, the "control unit" preferably refers to any computing device having a processor, a processor chip, a microprocessor or a microcontroller to allow for an automatic control of the components of device, such as the self-balancing wheels and/or potential actuators for adjusting the position of the counterweight, adjusting the stiffness of a connector between the support wheel and the frame etc. The components of the control unit may be conventional or custom-configured for the particular implementation. Preferably the control unit comprises a processor, a memory and computer code (software/firmware) for controlling the components of the device.

The control unit may also comprise a programmable printed circuit board, microcontroller, or other device for receiving and processing data signals from the components of the device, such as from sensors with respect to the position of self-balancing wheels or other sensory information in relation to angular position of the proximal and/or distal arm.

The control unit preferably further comprises a computer-usable or computer-readable medium, such as a hard disk, a random access memory (RAM), a read-only memory (ROM), a flash memory etc., on which a computer software or code is installed. The computer code or software to perform the control of the components of the device may be written in any programming language or model-based development environment, such as but not limited to C/C++, C#, Objective-C, Java, Basic/VisualBasic, MATLAB, Python, Simulink, StateFlow, Lab View, or assembler.

The software, and any functional descriptions of the software by description of controlling particular components or aspects of the device described herein, are considered technical features due to a direct physical output on the device. Functional descriptions of software may therefore be considered as preferred and defining embodiments of the invention. The particular computer code employed is available to a skilled person and may be constructed accordingly using standard knowledge.

The term "control unit is configured to" perform a certain operational step, such as determining the position of the proximal and/or distal arms with respect to the vertical and in response to the sensed data suppress or propagate the movement of a user by adjusting the position of the counterweight, adjusting the speed and/or direction of the self-balancing wheels, adjusting an angle α between the proximal and distal arms of the seesaw, adjusting a stiffness of the joints in the frame and/or adjusting the stiffness of a connector between the support wheel and the frame, may encompass a custom-designed or standard software installed on said control unit that initiates and regulates these operational steps.

In a preferred embodiment of the invention, an emergency stop button is provided at an accessible point on the device. This may cause the control device to stop any motorized movement and/or may cause a support wheel to drop to the ground. Preferably the emergency stop is located on an upper portion of the wheels or on top of the first axis such as to be easily visible and accessible to a nearby adult.

Depending on the needs and capabilities of the user, an emergency stop button may be provided on the harness or at such a point as to be operated by the user themselves.

The device of the invention may preferably also be configured for use with adults, teenagers or children who need not have any special mobility requirements. The device may preferably be adapted for use in leisure activities for example in hiking. This may substantially reduce exhaustion even in a healthy adult and reduce the risk of falls.

In a preferred embodiment, the device is configured for non-therapeutic use. In particular, the device may be configured for use with healthy users, in particular healthy adults. For example, the device may be configured for extending the length of a continuous walk taken by a user before exhaustion is reached.

In a further preferred embodiment, the device may be configured for increasing the number of repetitive movements which a user may carry out before exhaustion. Such movements may include jumping, turning, touching the ground etc. The device may also be configured for assisting a user in making such movements, such that their attention and efforts may be directed to refining aspects of the movements, such as the position of the arms for shooting a basketball. This is particularly advantageous in sports and dance where users are usually trained with various degrees of support from a trainer or from a handrail, depending on their experience level. The device may especially reduce the burden on the trainer, such that a user may independently practice various movements for a long period of time to attain perfection.

In a further aspect, the present invention relates to a method of using a mobility assistance device described herein comprising a step of propagating an intentional movement of a user by means of the device, while providing an at least partial body weight support.

In a preferred embodiment of the invention, the method of using the mobility assistance device comprises a step of propagating an intentional movement of a user for non-therapeutic purposes.

As an example, the intentional movement of the user may be a walking movement and the user may be a healthy adult. In this manner, the device may allow the user to extend the period for which they may walk without exhaustion. This may be particularly useful in the context of long hikes, especially over uneven or uphill terrain.

As a further example, the intentional movement of the user may be a jumping movement and the user may be a healthy adult. In this manner, the device may allow the user to practice and improve their technique in carrying out the jumping movement for a longer period of time without exhaustion. This may be particularly useful for improving form in the context of basketball, volleyball, dance or gymnastics training.

A person skilled in the art understands that technical features and advantages that have been disclosed in regards to the mobility assistance device described herein, equally apply to the method of using such a device for assisting the movement of a user, and vice versa.

DETAILED DESCRIPTION OF THE INVENTION AND EXAMPLES

It should be understood that various alternatives to the embodiments of the invention described herein may be employed in practicing the invention. It is intended that the claims of the invention define the scope of the invention and that the method and apparatus within the scope of these claims and their equivalents be covered thereby.

Without intending to be limiting, the invention will be explained in more detail with reference to exemplary embodiments and the following figures:

DETAILED DESCRIPTION OF THE FIGURES

The portion of the assistive mobility device acting as a seesaw will first be discussed conceptually in comparison with the prior art before proceeding to explain the features and dimensions of the device according to various preferred embodiments.

FIGS. 1-2 and 4-5 will first be discussed to compare the functioning of the seesaw of the present invention with the known prior art devices before moving onto explaining the different structural components of the invention with reference to FIG. 3.

Figure 1:
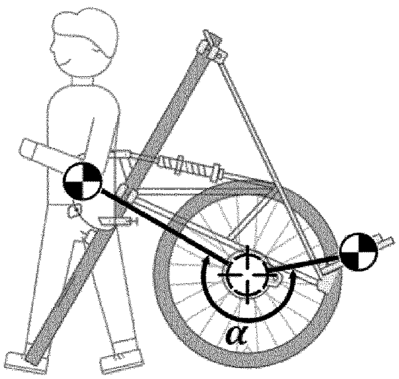
Fig. 1 (Prior Art)
FIG. 1 Schematic illustration of a side-view of the Hibbot walking aid of the prior art, highlighting the seesaw arrangement.
Figure 2:
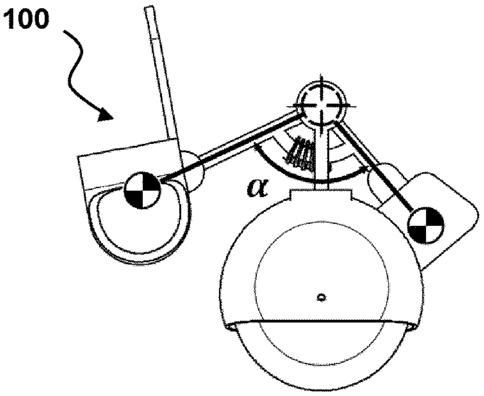
FIG. 2 Schematic illustration of a side-view of the mobility assistance device of the present invention, highlighting the see-saw arrangement.

FIGS. 1 and 2 are simplified schematic illustrations of the Hibbot mobility device of the prior art and the device of the present invention respectively. In both devices a seesaw-style assembly can be identified. In both cases, the effective beam lengths extend from the centres of gravity of the counterweight and the user to the fulcrum. The seesaw beams form a lower angle which faces the ground in their default positions; that is in the position where a user is standing upright. This lower angle, hereinafter a, is highlighted by a curved arrow in each of FIGS. 1 and 2 for comparison. The angle $\alpha$ of the prior art is always shown as being greater than 180°. In contrast, the angle $\alpha$ of the present invention is preferably not greater than 180°.

The angle of the theoretical beam connecting the centre of gravity of the counterweight to the fulcrum dramatically influences the effective moment created by the weight. This is because the force of the weight acts vertically downwards due to gravity. However, depending on the angle, a greater or smaller component of this force will act orthogonally to the lever. As extreme cases, the full weight of the counterweight contributes to producing the moment when the beam is horizontal and none of the weight produces any moment when the beam is vertical. The greater the moment produced by the counterweight, the greater the uplift force produced acting on the user. The angle $\alpha$ of the present invention is selected not only to make for a more compact device but also to optimize the uplift force applied on the user in different positions.

Figure 4:
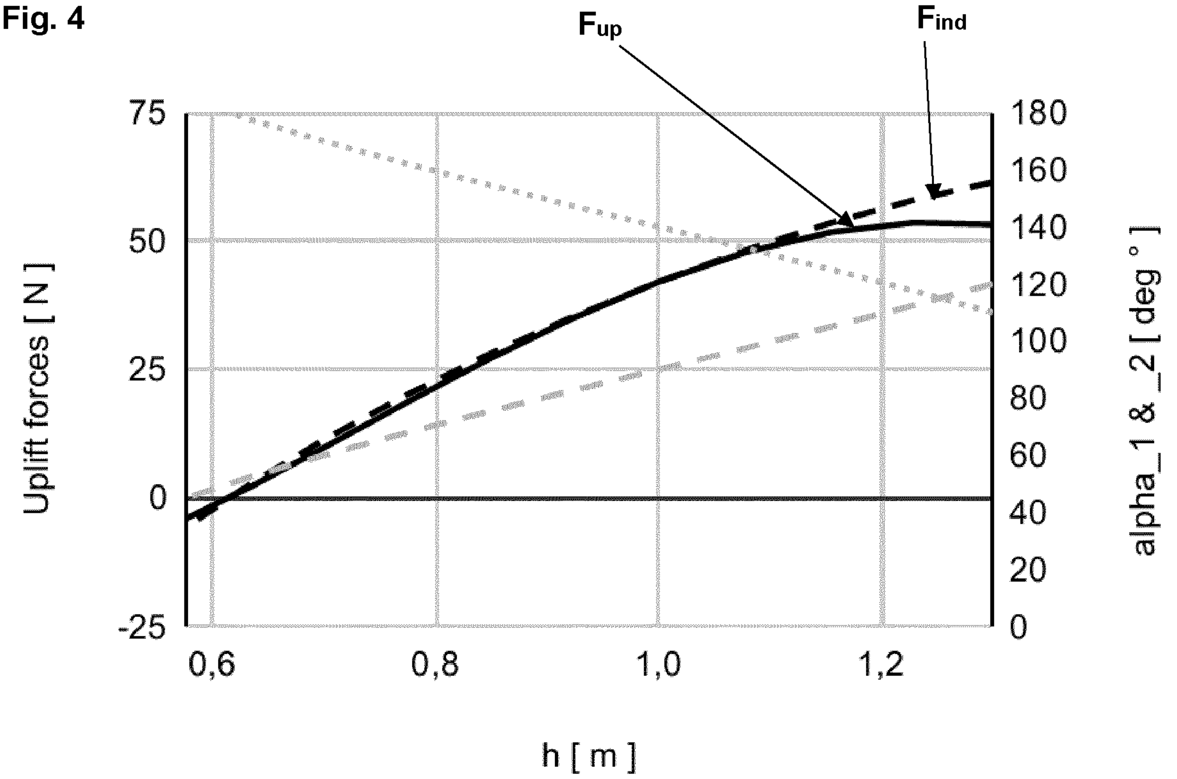
FIG. 4 Graphical illustration of the change of uplift forces with changing user height in the Hibbot walking aid of the prior art.
Figure 5:
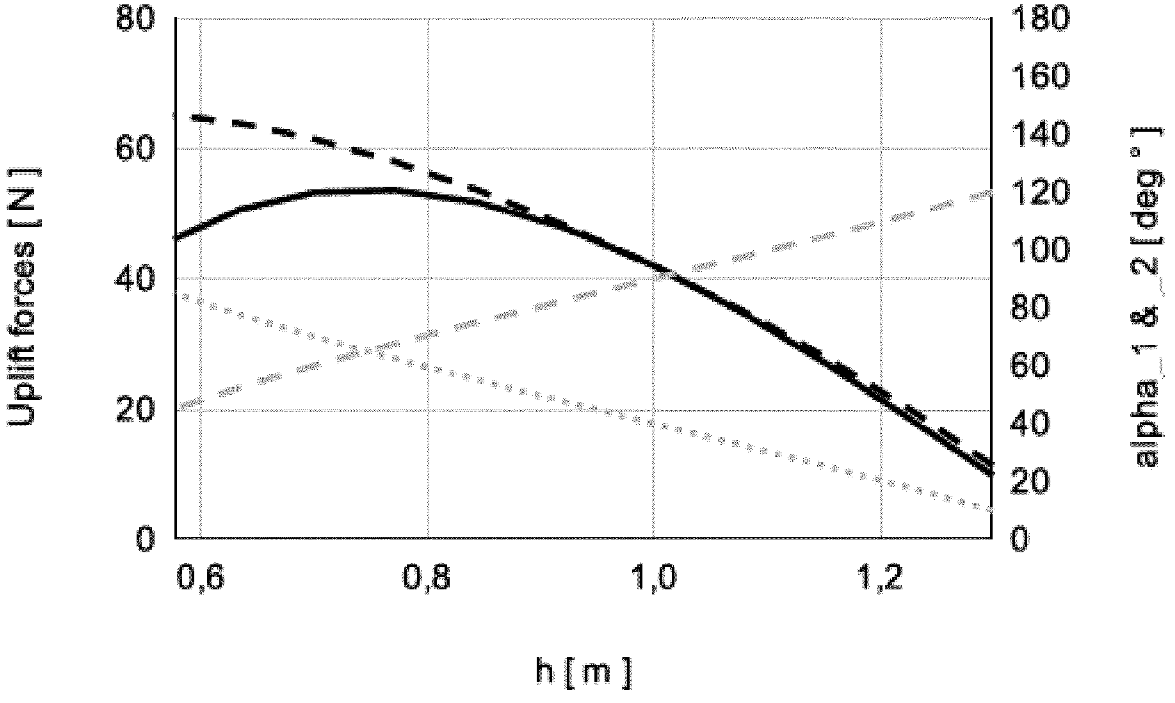
FIG. 5 Graphical illustration of the change of uplift forces with changing user height in a mobility assistance device according to the present invention in which the angle α is 130°.

This is illustrated graphically in FIGS. 4 and 5 which compare the relationship between the uplift force and the height of the user's centre of gravity for different angles. In these figures, a straight dashed line represents a user-side angle $\alpha_2$ and a dotted line represents a counterweight-side angle $\alpha_1$, both read on the right hand y axis. $\alpha_2$ becomes steadily smaller as the user crouches downwards whereas $\alpha_1$ increases. The opposite is true when the user rises upwards. A dashed curve represents a total force acting on the user due to the moment caused by the counterweight and a solid curve represents an uplift force component acting on the user, wherein the forces in Newton are read on the left hand y axis. FIG. 4 illustrates a case study in which the angle $\alpha$ is 230°. FIG. 5 illustrates a case study in which a is 130°. In both cases a length $L_1$ from the fulcrum to the centre of gravity of the counterweight is 0.4 m and a length $L_2$ from the fulcrum to the centre of gravity of the user is 0.6 m. In FIG. 4, the effective uplift force acting on the user is at a maximum when the user is upright and is significantly lower or even negative when the user is closest to the ground. The implication of this is that such a device cannot support a user in getting up again after reaching down to the ground. The assistance of a care-giver is typically required.

On the other hand, as illustrated in FIG. 5, when the angle $\alpha$ is selected at 130°, the uplift force acting on the user increases as the centre of gravity of the user sinks lower, thereby assisting the user in returning to an upright position. This teaching has been exploited to optimize the angles and dimensions selected for the seesaw mechanism of the invention.

Figure 3:
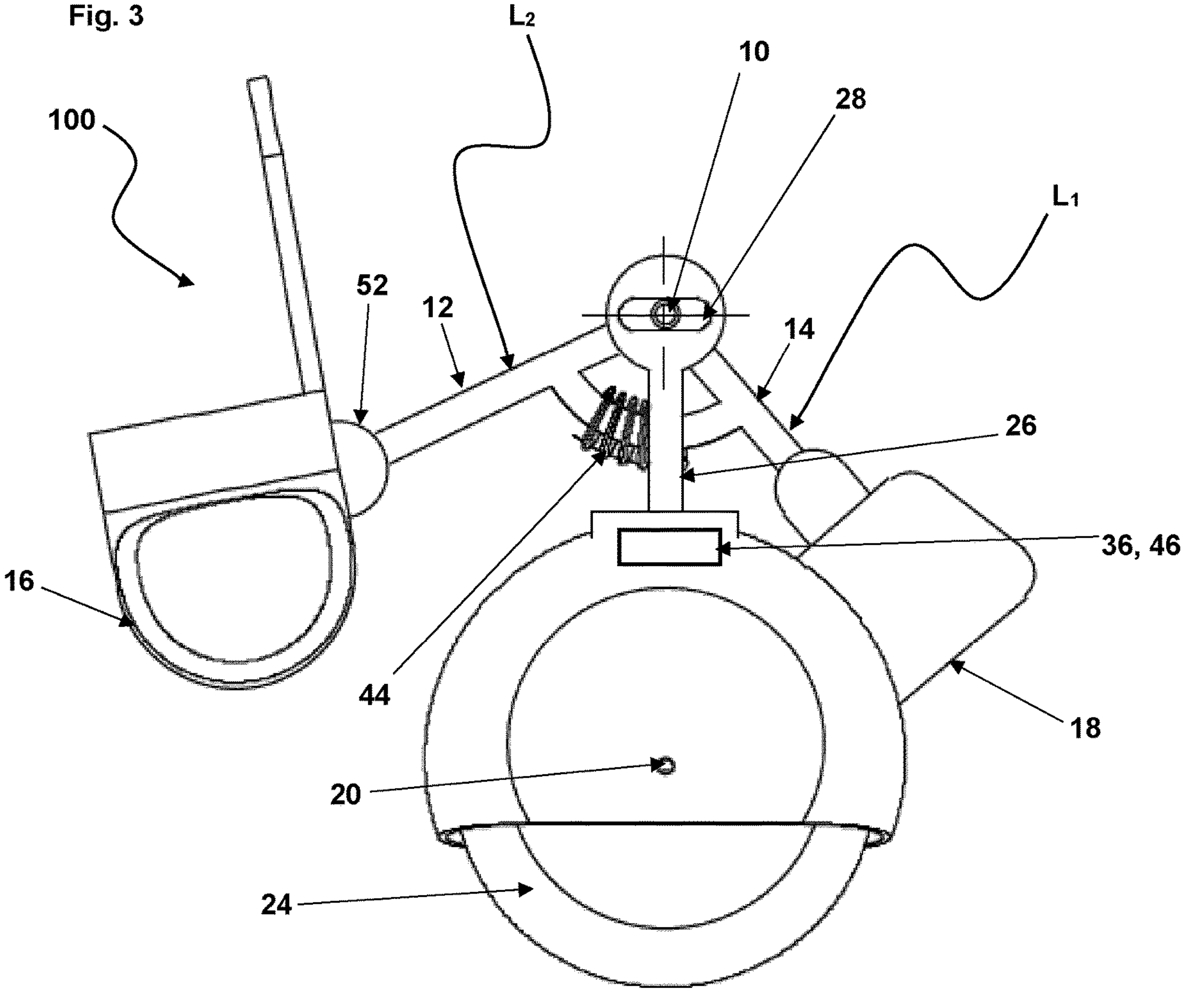
FIG. 3 Schematic illustration of a side-view of mobility assistance device according to the present invention with a first axis positioning slot and without support wheels.

Turning now to FIG. 3, the structure of a mobility assistance device 100 according to the invention may be studied in more detail. The device comprises a frame 26 which may preferably be made of extruded aluminum for strength and weight-saving. The frame 26 connects the main parts of the device with each other and may advantageously comprise telescopic portions enabling the overall dimensions of the device to be adapted to the changing needs of a growing child or to different users. The frame joins a set of wheels, in this case two self-balancing wheels 22 and 24 to a first axis 10 which acts as the fulcrum of the seesaw. The self-balancing wheels are configured to rotate about a second axis 20, below the first axis. The first axis 10 joins two arms together: a proximal arm 12 and a distal arm 14. The ground-facing angle $\alpha$ between these two arms is preferably fixed at a value up to 180°. The angle may also be adjusted by means of an arcuate telescopic portion 44 of the frame connecting the two arms together. In this embodiment, the arc connector is additionally spring-loaded. The proximal arm 12 is connected to a harness 16 configured to carry a user. A coupling 52 connects the harness to the user. Preferably this coupling comprises a shock absorber. The coupling 52 may also preferably be articulated within a limited range of angles. The distal arm 14 is connected to a counterweight 18 configured to at least partially compensate the weight of the user.

The length of the proximal arm between the first axis 10 and a point at which it is coupled to the harness 16 can be used as an approximation of a theoretical beam length between the first axis and the position of a user's centre of gravity when in the harness 16. The length of the proximal arm is given the reference $L_2$. In the case where the proximal arm does not extend to the user's centre of gravity, $L_2$ is the physical length of the arm 12 and is a mere approximation of the theoretical length to be taken into account when calculating the moments acting on the seesaw. The length of the distal arm between the first axis 10 and the counterweight 18, preferably more precisely defined as the length from the first axis to the centre of gravity of the counterweight 18 is referred to as $L_1$.

It is preferable in some embodiments that the first axis 10 is shifted forward with respect to the second axis 20. That is, the two axes need not be vertically aligned. The forward shift may be adjusted by housing the first axis 10 in a slot spanning portions of the frame 26. This slot is illustrated as 28 and may be configured for manual adjustment of the horizontal position of the first axis. It is also preferable that the angular position of the proximal and/or distal arm is monitored by an angle sensor. Data from the angle sensor may be fed to a control unit 36 to assist in propagating a voluntary movement of the user or to return the user to a default upright position for example.

FIGS. 6 to 14 show a variety of different structural arrangements of the mobility assistive device of the invention wherein particularly the frame 26 is adapted to different user needs.

Figure 6:
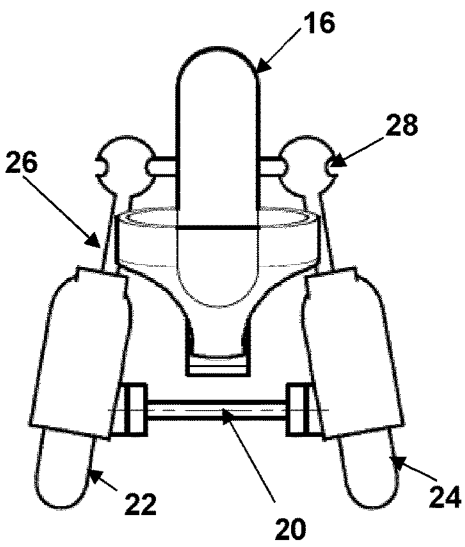
FIG. 6 Illustration of a frontal view of a mobility assistance device according to a first embodiment of the present invention.
Figure 7:
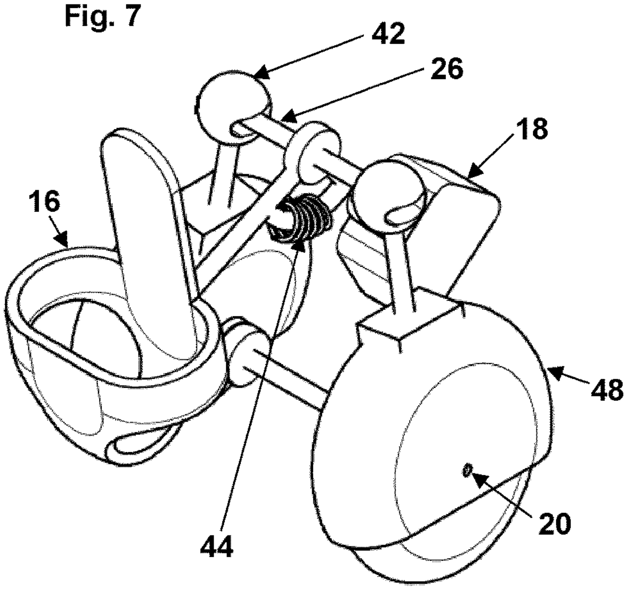
FIG. 7 Illustration of a perspective view of the mobility assistance device according to the first embodiment of the present invention.

FIGS. 6 and 7 show a frontal and perspective view of the mobility assistance device according to a first embodiment of the invention. Notably in this embodiment, no support wheel 38 has been included making this particular embodiment suited for a user with low risk of falling. The device may mainly be used to reduce exhaustion in such a user while maximizing the range of movement. The additional support wheel and other optional features may be included in this and any of the further embodiments disclosed herein, in a variety of positions and arrangements.

The harness 16 of the first embodiment comprises a bucket-type seat and a backrest. The type of harness may be selected depending on the size and needs of the user. Preferably, the harness is padded. Two self-driving wheels are used which are joined together along the second axis 20 by a part of the frame 26. An upper part of the frame joining the wheels to the first axis comprises ball joints each equipped with a slot for adjustment of the position of the first axis. The whole device including the counterweight 18, the frame 26 and the wheels 22 and 24 is configured to follow a user from behind such that the forward direction is the direction of the harness. This provides the user with greater freedom and stability.

Figure 8:
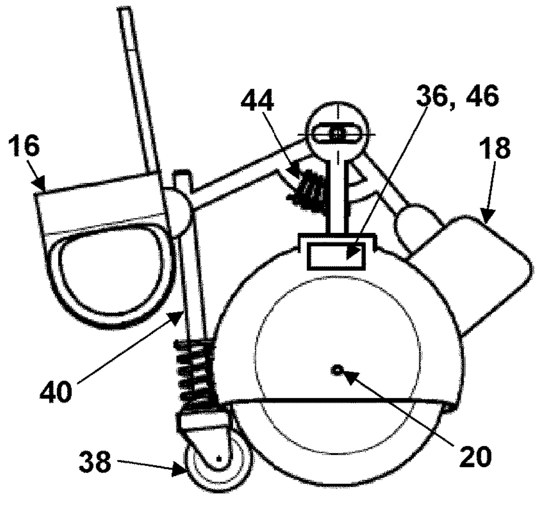
FIG. 8 Illustration of a side view of the mobility assistance device according to a second embodiment of the present invention.
Figure 9:
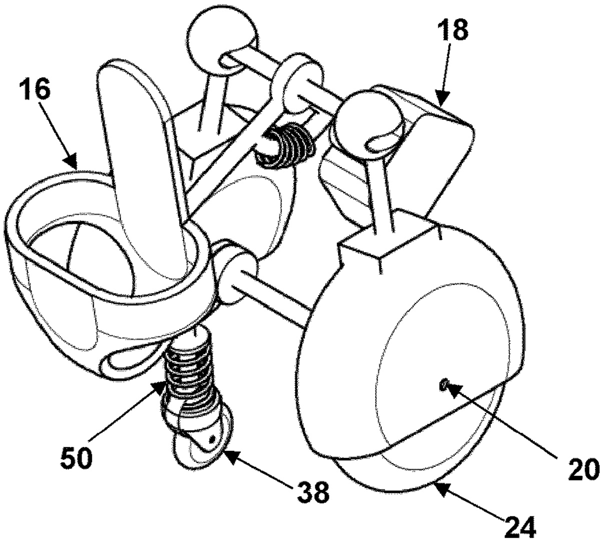
FIG. 9 Illustration of a perspective view of the mobility assistance device according to the second embodiment of the present invention.

FIGS. 8 and 9 show respectively a side and perspective view of a mobility assistance device according to a second embodiment of the invention. The device has a similar structure to that of the first embodiment with the exception that a support wheel 38 is included connected by a spring-loaded frame member 40 to the proximal arm 12. The length of the connector 40 has been set in this case to touch the floor as soon as the user's centre of gravity falls below a range considered normal for walking or standing. This causes the spring-loaded member to be slowly compressed such that the descent of the user is controlled to a gradual stop. This reduces shock and discomfort to the user, preventing risk of injury. Such a configuration of the support wheel may be particularly suited to a user whose motor skills do not allow safe crouching or crawling followed by getting back up, such that any significant drop in the user's centre of gravity is interpreted as a fall and prevented by the support wheel. The length and position of the connector 40 may preferably be adjustable according to the user's needs. Shortening the length of 40 would allow the user to come closer to the ground without intervention from the device.

In this particular embodiment, a mechanical compression spring 50 is used to absorb shock when the support wheel 38 reaches the ground. Other arrangements using tension or torsion springs or further alternatives such as a pneumatic or hydraulic system may also be used.

Figure 10:
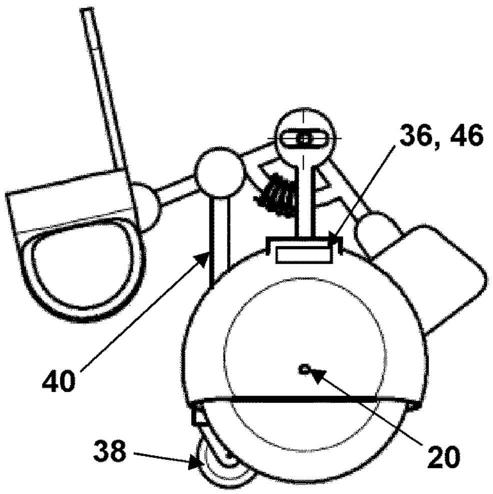
FIG. 10 Illustration of a side view of the mobility assistance device according to a third embodiment of the present invention.
Figure 11:
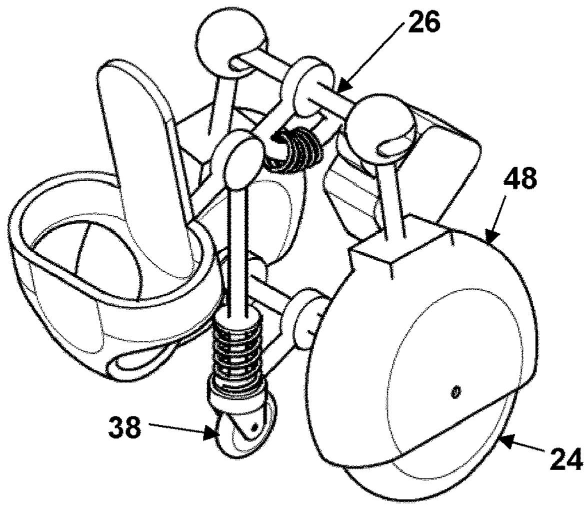
FIG. 11 Illustration of a perspective view of the mobility assistance device according to the third embodiment of the present invention.

FIGS. 10 and 11 show respectively a side view and a perspective view of a mobility assistance device according to a third embodiment of the invention. In this embodiment, the support wheel 38 is positioned substantially between the two self-driving wheels 22 and 24, leaving the floor space immediately behind the harness clear for the user to move their legs without conflicts with the device. FIG. 10 also shows schematically the preferred position of a set of wheel sensors 46 in a casing 48 of the self-driving wheels.

Figure 12:
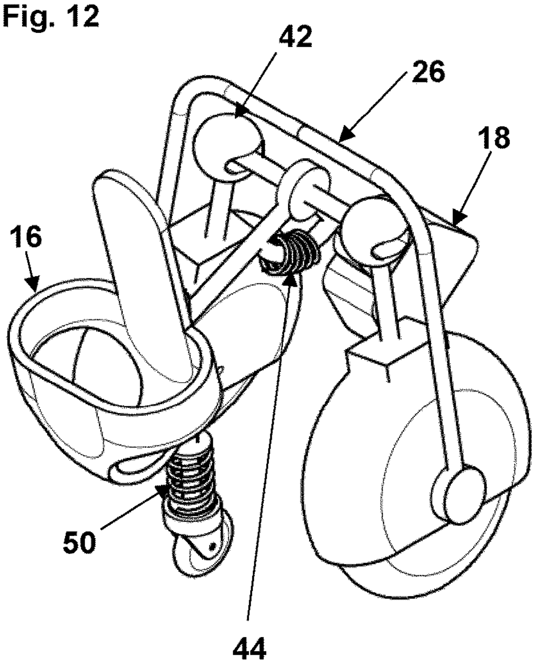
FIG. 12 Illustration of a perspective view of the mobility assistance device according to a fourth embodiment of the present invention.
Figure 13:
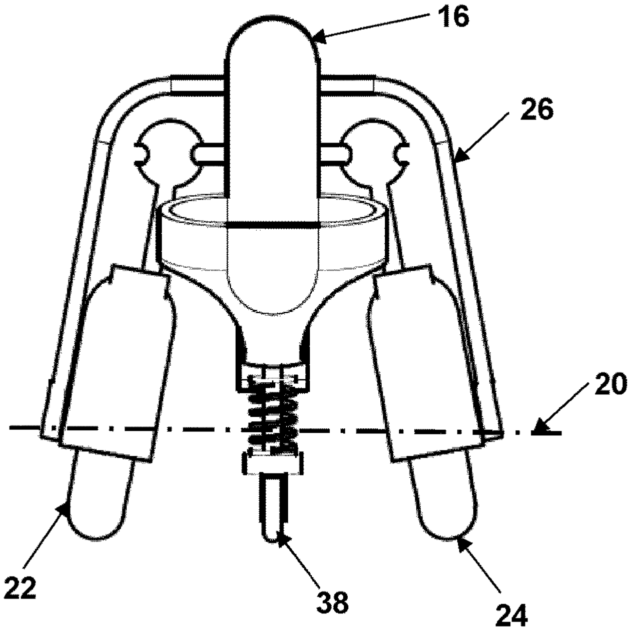
FIG. 13 Illustration of a frontal view of the mobility assistance device according to the fourth embodiment of the present invention.

FIGS. 12 and 13 show respectively a perspective and frontal view of a mobility assistance device according to a fourth embodiment of the invention. This is structurally similar to the first, second and third embodiments with the exception that the frame 26 does not join the wheels directly along the second axis but extends outwardly from the self-driving wheels and up to form a handle member of the frame. This arrangement is particularly advantageous as it leaves the space between the wheels free for the user. Fewer components on the underside of the device also allows for greater simplicity and for a lower likelihood of objects or ground imperfections to get in the way of the device. An optional support wheel 38 is included in this embodiment. The wheel suspends from an end of the proximal arm 12 close to the harness.

Figure 14:
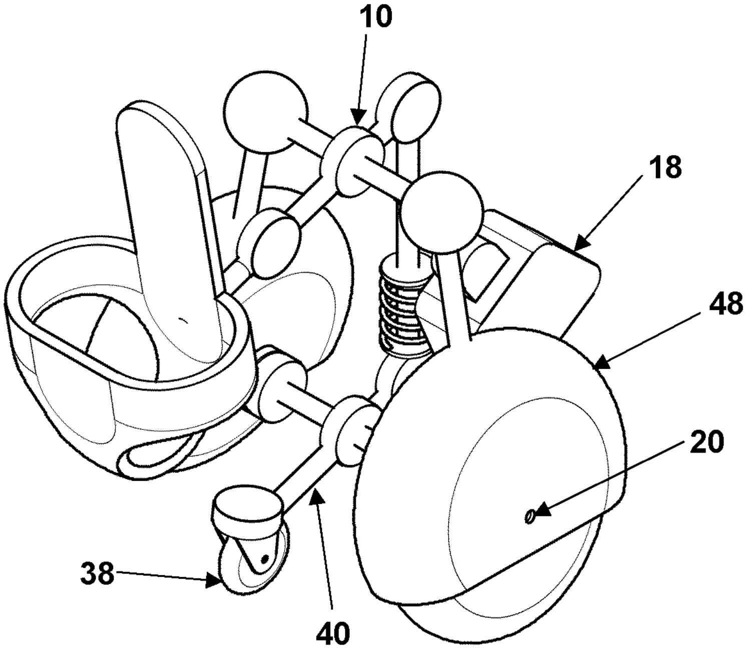
FIG. 14 Illustration of a perspective view of the mobility assistance device according to a fifth embodiment of the present invention.

FIG. 14 shows a perspective view of a further frame arrangement according to a fifth embodiment of the invention. This embodiment comprises two support wheels 38: one suspended from the distal arm 14 and another arranged on a member of the frame 26 connecting the two self-balancing wheels.

Regardless of the structural arrangement of the mobility assistance device, it is preferred that a set of wheel sensors 46 are housed in a casing 48 of the self-driving wheels. Each self-driving wheel may have its own independent set of sensors. These may include a gyroscope, an accelerometer and/or a magnetometer. An angular position sensor may be provided in an arc portion of the frame 26 between the distal and proximal arms to measure their angular position. The harness may further comprise a strain gauge and/or a pressure sensor, for example in the back rest, to identify a leaning posture of the user which may be interpreted as a desire to move backward. The harness may alternatively or additionally comprise strain gauges or pressure sensors in the sides to identify a user's intention to turn left or right. An optional strain gauge or pressure sensor in a groin portion of the harness may identify a user's vertical posture, for example as standing on tiptoes.

Data from the sensors may be fed to a control unit 36. This may be housed anywhere on the device. As an example, it may be housed in the wheel casing along with the sensors as shown in FIG. 3. In all embodiments, the control unit 36 may be configured to interpret whether sensed data corresponds to voluntary or involuntary movements from the user. Preferably a force and/or duration threshold may be used to classify sensed movements. A stronger movement which is sustained for longer may be interpreted as voluntary. The control unit 36 may be configured to adjust various device parameters to support a movement considered involuntary and to suppress or ignore involuntary movements. For example, the position of the counterweight 18 along the distal arm may be adjusted by a motor controlled by the control unit to adapt the uplift force to the user's intention.

FIGS. 15 to 18 show conceptually the forces acting on the user due to the mobility assistive device.

Figure 15:
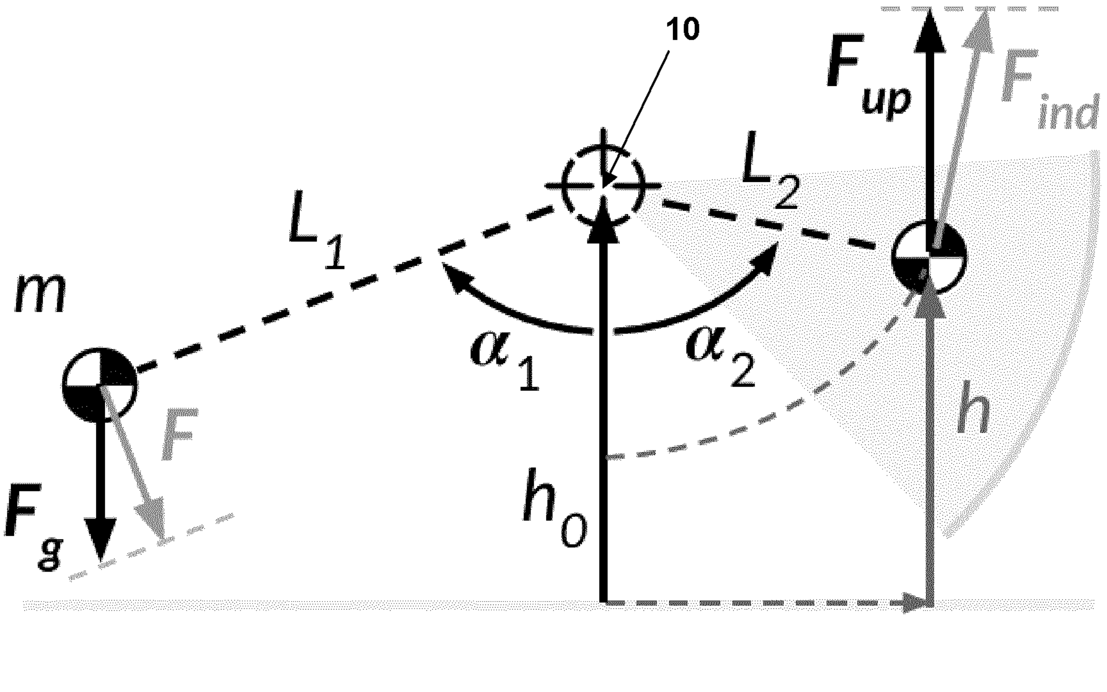
FIG. 15 Schematic representation of the upward-downward forces acting on a user due to the see-saw mechanism of the mobility assistance device according to the invention.

FIG. 15 represents a conceptual analysis of the forces acting on a user in a default position due to the seesaw assembly. This includes the counterweight 18, the distal arm 14, the first axis 10, the proximal arm 12 and the harness 16. The first axis 10 is provided at a height $h_0$ from a supporting surface such as the ground. The arms are arranged to form a fixed ground-facing angle $\alpha$ between them, wherein a may be divided into $\alpha_1$ and $\alpha_2$ by the vertical line passing through the first axis 10. The centre of gravity of the counterweight is shown as m in FIG. 15. Counterweight m is disposed at a length $L_1$ from the first axis and its weight $F_g$ acts directly downwards. When $\alpha_1$ is less than 90°, a component F of the weight force $F_g$ acts orthogonally to the distal arm. A moment acting on the first axis 10 due to the counterweight is then $F \times L_1$. FIG. 15 also represents a user by their centre of gravity. In a default position, the user is upright and their centre of gravity is at a height h from the ground wherein h is less than $h_0$. By default, the proximal arm is at an angle $\alpha_2$ from the vertical. The moment $F \times L_1$ results in a force Find acting orthogonally to the proximal arm. A component $F_{up}$ of this force acts on the user, wherein $F_{up}$ can be calculated as $\text{Find} \times \text{Sin}(\alpha_2°)$.

The range of heights which the centre of gravity of the user may take may be limited by a support wheel or otherwise. This range of heights is highlighted in FIG. 15. The angular position of the proximal arm may thus span this highlighted sector. The dimensions and angles used for the seesaw assembly may be configured to take this into account.

Several case studies have been used to optimize the dimensions of the mobility assistance device for a user who is a child with cerebral palsy. It was found that the total angle $\alpha$ was best selected to be between 90° and 180°, more preferably between 120° and 140°, even more preferably between 120° and 130°.

In a first case (high uplift with little height variation) it was found that the seesaw could be made more sensitive by setting a at 130°, $L_1$ at 0.6 m and $L_2$ at 0.2 m. The height of the first axis $h_0$ was 1 m. The mass of the counterweight was 10 kg. It was found that at these dimensions, the weight of the child could be effectively compensated such that a small lowering in the height of the child's centre of gravity resulted in a large uplift force bringing the child back up.

In a second case (low uplift with large height variation) it was found that the range of movements of the child could be increased while reducing the uplift force when the mass of the counterweight was 10 kg. The length $L_1$ was set at 0.4 m, $L_2$ at 0.6 m and the angle $\alpha$ at 120°. The variation of uplift force with the user's vertical position in this case was gentler. These dimensions were therefore more suitable for a child with greater muscle strength for which less mechanical intervention was required.

Figure 16:
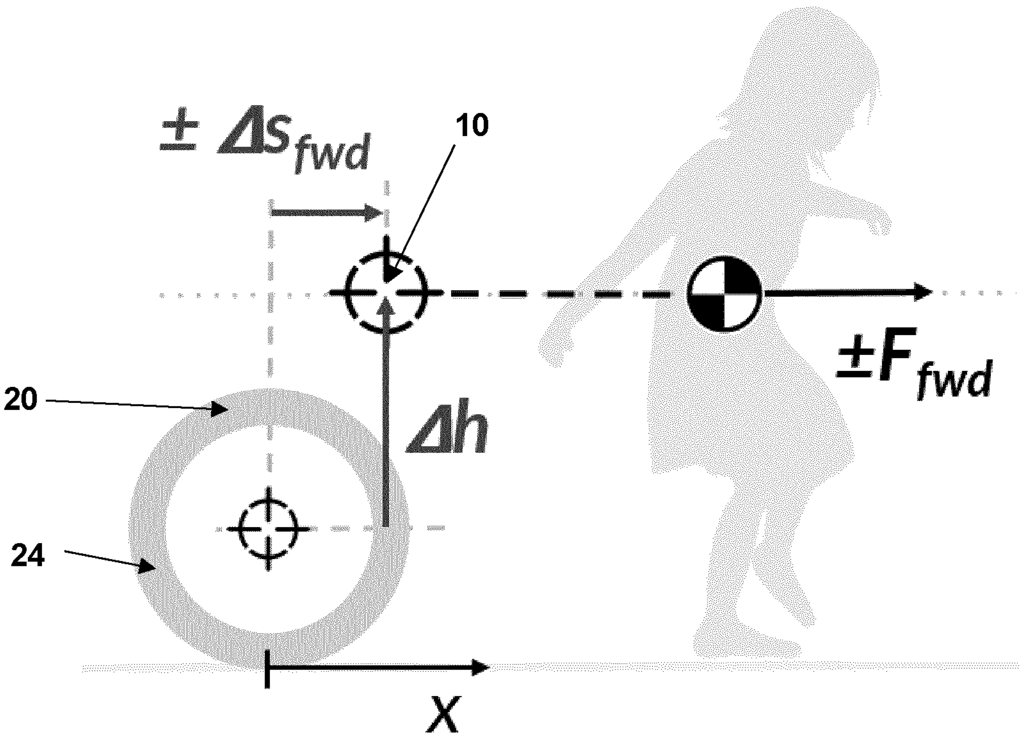
FIG. 16 Schematic representation of the forward-backward forces acting on a user due to the self-balancing wheels and the forward axial shift.
Figure 17:
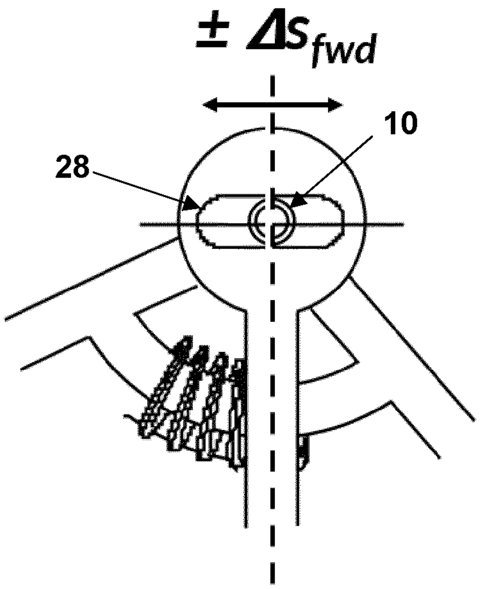
FIG. 17 Schematic representation of a housing slot for the first axis in which the forward axial shift is adjustable.

FIG. 16 illustrates the relative positions of the first and second axes. The rest of the seesaw is not shown. The first axis is positioned at a height $\Delta h$ above the second axis. Preferably, the first axis is also shifted forwards in the x direction with respect to the second axis by +/−Δs_fwd. This results in the centre of gravity of the seesaw being ahead of the second axis, resulting in a moment about the second axis. The size of the moment depends on the weight of the seesaw, the height difference $\Delta h$ and the shift in the x direction Δs_fwd. The angle $\theta$ may be adjustable by moving the position of the first axis horizontally, for example by means of a housing slot as shown in FIG. 17.

The self-balancing wheels operate as a wheeled inverted pendulum system. A set of sensors 46 in each self-balancing wheel detect the shift of the centre of gravity from the a vertical line passing through the center of rotation of each wheel. The wheels maintain the balance of the system by steering into the shift, that is by moving forwards. The device is therefore biased towards moving forwards.

Figure 18:
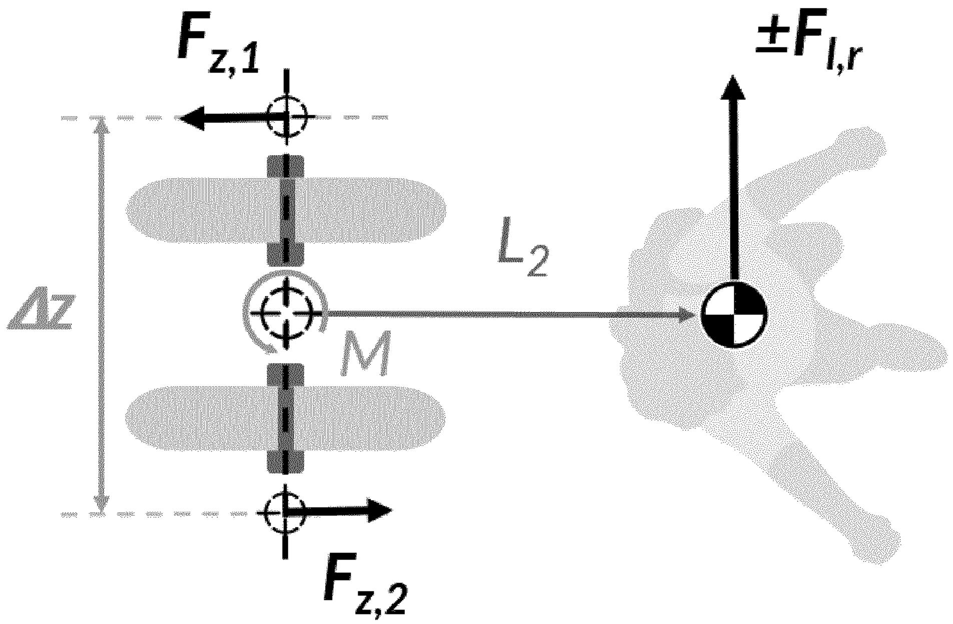
FIG. 18 Schematic representation of a top view of the self-balancing wheels and the user showing the forces applied to the device for the user to turn left.

FIG. 18 illustrates conceptually the forces acting on a user during turning of the device. The user begins turning left by applying a force against the left side of the harness. This may be sensed by a sensor and propagated if considered voluntary by the control unit. The force applied by the user creates a moment M via the length $L_2$ of the proximal arm acting on the centre point of the device preferably aligned with the z axis. The turning moment tilts the self-balancing wheels in opposite directions each of which are within their x plane as defined above, inducing rotations of the wheels correspondingly as a counteractive action, thus causing the device to move around as a whole.

Figure 19:
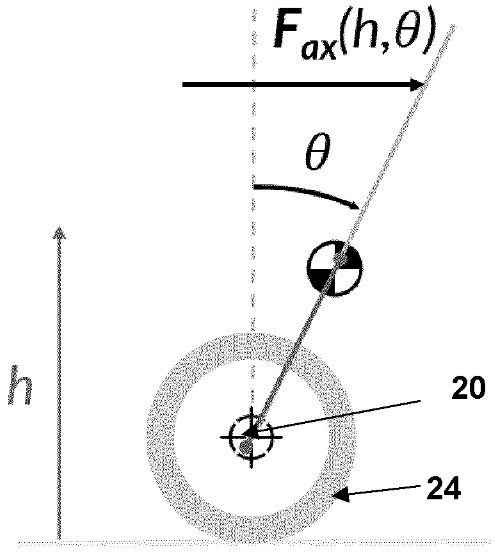
FIG. 19 Schematic representation of the axial forces acting on the device due to the forward axial shift.

FIG. 19 illustrates the force required to tilt a self-balancing wheel by an angle $\theta$ out of the vertical position. The force is a function of the height. It can thus be appreciated that the height of the first axis with respect to the second axis has a direct effect on the sensitivity of the system.

Figure 20:
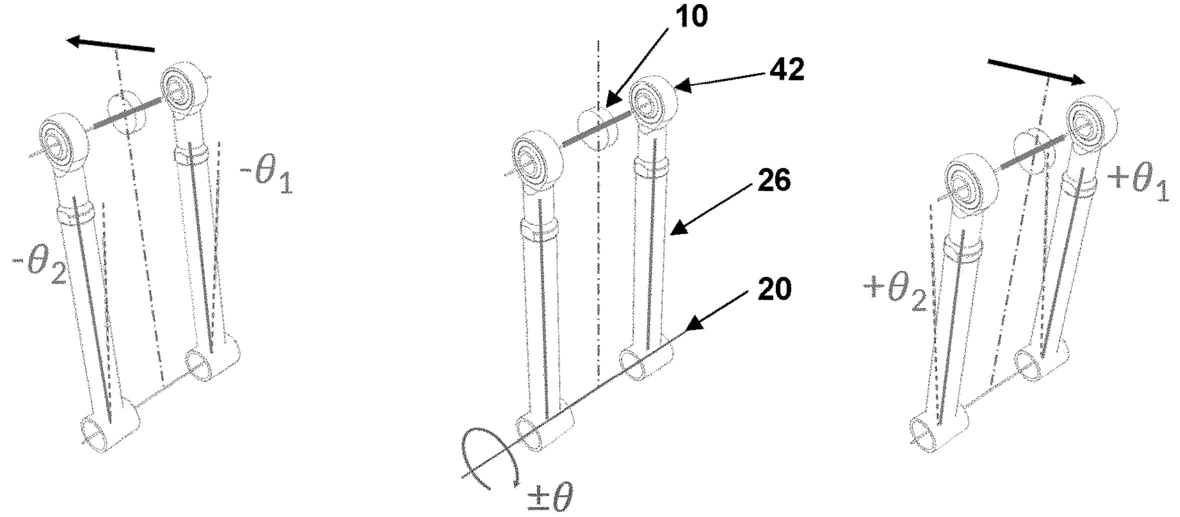
FIG. 20 Schematic representation of ball-jointed frame members defining the second axis and their positions when tilted backwards and forwards.

The self-balancing wheels may be joined together by the frame 26. FIGS. 20 and 21 illustrate a preferred embodiment of frame members (also referred to herein as frame portions) connecting the second axis of the self-balancing wheels to the first axis. In FIG. 20, a tilting function of the frame is shown. Here, an upper member of the frame 26 comprising the first axis may be shifted backwards and forwards by an angle $\theta$ with respect to the second wheel axis. When tilting, the angle $\theta_1$ and $\theta_2$ formed by a left and right member of the frame respectively is equal and in the same direction for both members.

Figure 21A:
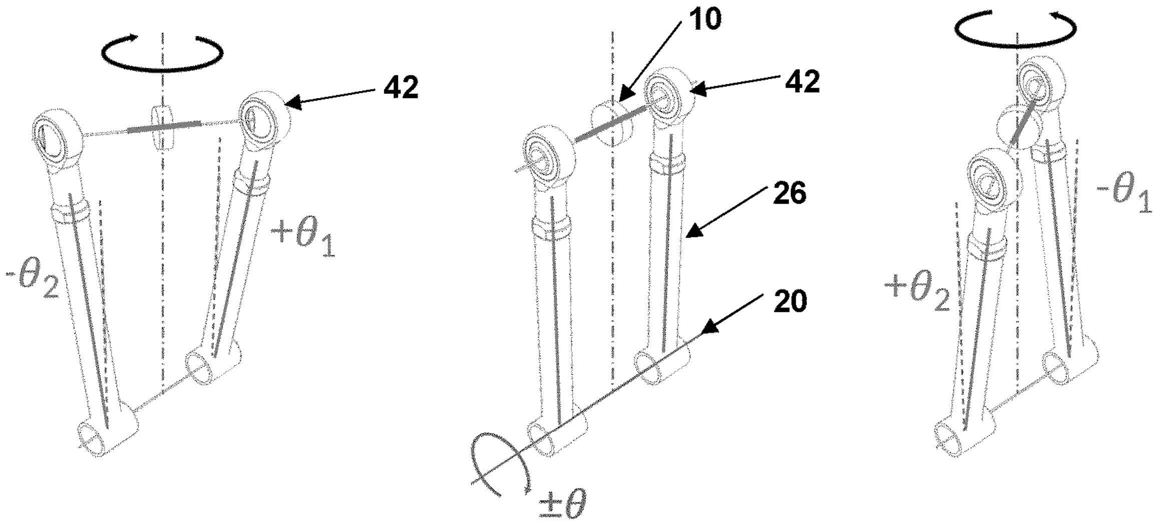
FIG. 21A Schematic representation of ball-jointed frame members defining the second axis and their positions when turning right and left.

In FIG. 21A, a turning function of the frame is illustrated. In this case, the angles $\theta_1$ and $\theta_2$ are only equal in value if both left and right members are equidistant to the centre point of the device. The directions of the two angles are however opposite to each other. To allow the user to make such a turn while the wheels remain in position, it is preferable to use ball joints at an upper end of the left and right members. The left and right members may be connected via a transverse frame member to the first axis which is halfway between them. This allows the seesaw to follow the user when the user turns so that the centre of gravity of the device including the user causes a moment about the centre of the device. The self-balancing wheels may then follow by turning about the centre point preferably aligned with the z axis, shown by a dashed line, and realigning themselves. Since the wheels turn around one point, the turning circle of the device is kept minimal. This saves space and allows the device to be easily maneuverable indoors and outdoors.

Figure 21B:
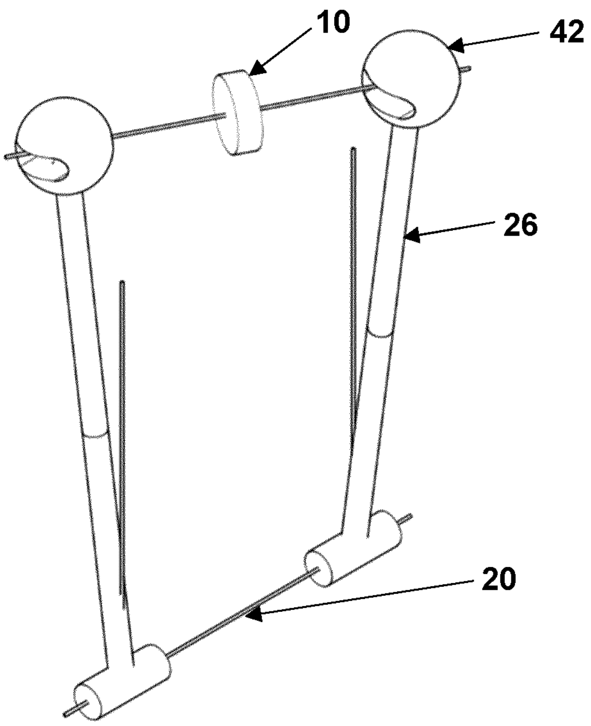
FIG. 21B Schematic representation of a slotted ball-joint for accommodating left and right turning.

FIG. 21B shows a preferred embodiment of the ball joints in which a slot is provided to accommodate a differing distance between the left and right frame members when a user begins to turn right.

Figure 22:
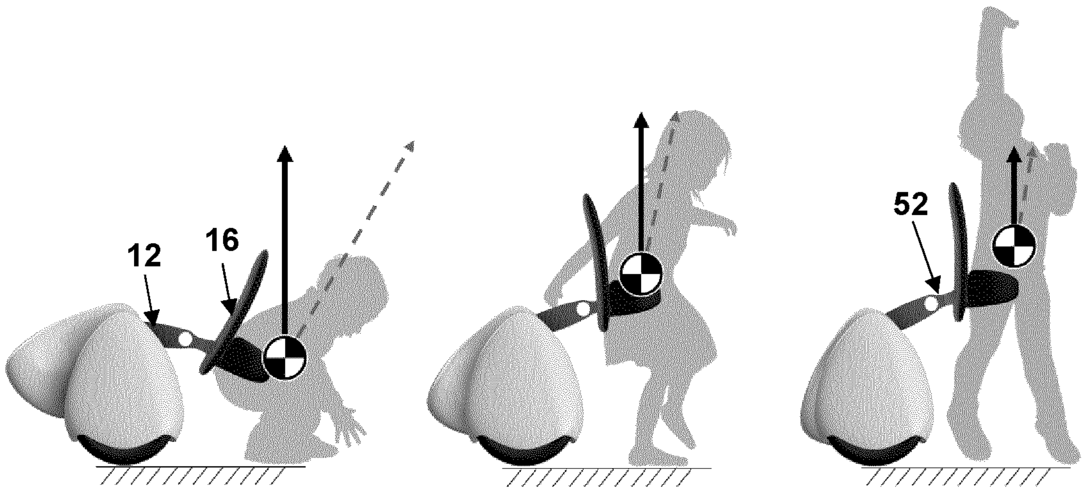
FIG. 22 Side view of the mobility assistance device according to a sixth embodiment illustrating a user in a low, standing and high posture.

FIG. 22 illustrates a mobility assistance device according to a sixth preferred embodiment in which the self-driving wheels are encased, preferably leaving only a small portion of the wheel exposed. In this embodiment, the frame, distal arm and counterweight are also almost entirely encased. The proximal arm is left free to provide the user with more space. By encasing the device where possible, the safety may be improved, especially in the case of children interacting with each other. The smooth outer surface reduces the likelihood that any clothes, toys or other objects may be trapped in the narrow spaces or articulated parts of the device.

In the sixth embodiment, the proximal arm is also articulated at or close to the point where the harness is attached. This allows the position of the harness, for example a seat, to be adjusted for the user. It may also allow the user to position their back freely at an angle to the proximal arm. That is, when moving downwards, they must not also be facing the ground but may retain a natural posture. It is also particularly preferable that the linkage 52 between the harness and the proximal arm comprises a shock absorber, for example a rubber shock absorber.

Although not shown in this illustration, an emergency stop button is provided at an accessible point on the device. Preferably the emergency stop is located on an upper portion of the wheels or on top of the first axis such as to be easily visible and accessible to a nearby adult.

The control unit may be configured to activate an emergency stop sequence when the emergency stop button is pressed. Preferably this causes the control device to immediately or gradually stop any motorized movement and/or may cause a support wheel to drop to the ground.

Figure 23:
FIG. 23 Perspective view of a three-dimensional model of the mobility assistance device according to a seventh embodiment in which the arms are not shown.
Figure 24:
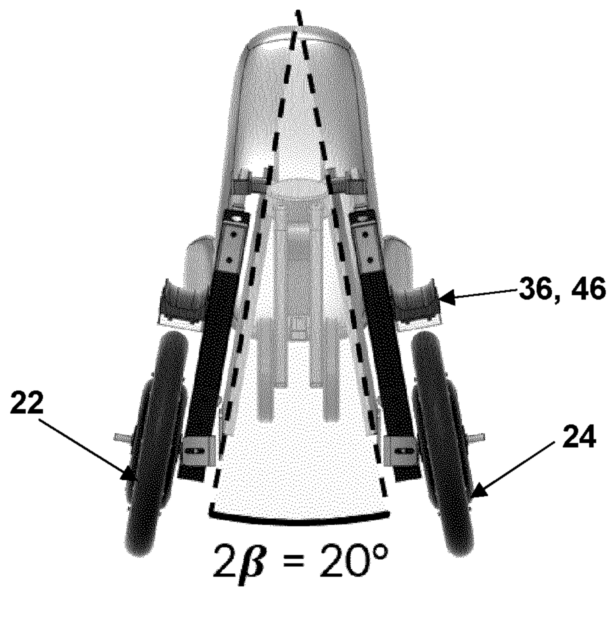
FIG. 24 Rear view of the mobility assistance device according to the seventh embodiment in which the camber angle of the self-driving wheels is highlighted.

Finally, the FIGS. 23 and 24 illustrate a perspective and rear view of a mobility assistance device according to a seventh embodiment of the invention. For visibility, not all parts are shown in these figures. In this embodiment, the wheels are negatively cambered by 10° such that the upper angle formed by a theoretical triangle spanning the ground and a centre line of each wheel is 20°. An inner angle β between the centre line of each wheel and the ground is thus about 10°. It was found that this angle significantly increased the stability of the device and its safety.

LIST OF REFERENCE SIGNS

100 Mobility Assistance Device
10 First Axis
20 Second Axis
L1 Length from First Axis to Counterweight
L2 Length from First Axis to Harness
12 Proximal Arm
14 Distal Arm
16 Harness
18 Counterweight
22 First Self-Balancing Wheel
24 Second Self-Balancing Wheel
26 Frame
28 Slot for Forward Shift Adjustment
30 Set of Wheels
32 User
34 User's Centre of Gravity
36 Control Unit
38 Support wheel
40 Support wheel Frame Connector
42 Ball Joint
44 Angle Adjustment Frame Connector
46 Set of Sensors
48 Wheel Casing
50 Spring
52 Harness-Arm Coupling

The invention claimed is:

1. A mobility assistance device comprising:
a set of wheels connected to each other by a frame,
a distal arm,
a proximal arm and
a first axis between the distal arm and the proximal arm wherein the distal and the proximal arms are pivotably arranged about the first axis and are operatively connected to the frame,
wherein a harness for receiving a user is provided on the proximal arm at a length L2 to the first axis,
wherein a counterweight is provided on a distal arm at a length $L_1$ to the first axis and wherein the counterweight and both of the lengths $L_1$ and $L_2$ are configured to at least partially compensate the weight of the user, characterized in that
the mobility assistance device further comprises a control unit and the set of wheels comprises at least two self-balancing wheels,
wherein the control unit is configured to control the self-balancing wheels in accordance with an inverse pendulum principle.

2. The mobility assistance device of claim 1 wherein the first axis is arranged at a height $h_o$ from a ground and the at least two self-balancing wheels are configured to rotate about a second axis arranged at a height less than $h_o$ from the ground.

3. The mobility assistance device according to claim 2 wherein the position of the first axis is shifted forwards in the direction of a user with respect to the second axis.

4. The mobility assistance device according to claim 1 wherein a ground-facing angle a formed between the distal and proximal arm is equal to or less than 180°.

5. The mobility assistance device according to claim 1 wherein the device further comprises a support wheel connected in a spring-loaded fashion below the proximal arm, the distal arm or the frame and configured to prevent the harness from uncontrolled falling during use.

6. The mobility assistance device of claim 5 wherein the support wheel is positioned to allow the user to vary their height within a range corresponding to standing on tip-toes, walking, crouching and/or crawling.

7. The mobility assistance device according to claim 1 wherein the counterweight has a mass between 5-30 kg.

8. The mobility assistance device according to claim 1 wherein the position of the counterweight on the distal arm is automatically variable.

9. The mobility assistance device according to claim 1 wherein the frame is arranged on outer sides of the wheels, leaving a gap between the wheels free.

10. The mobility assistance device according to claim 1 wherein the harness is connected pivotably to the proximal arm.

11. The mobility assistance device according to claim 1 wherein the frame comprises a left member and a right member coupled by means of ball joints to a transversal member housing the first axis.

12. The mobility assistance device according to claim 1 wherein the control unit is configured to interpret a force applied by the user and to command a motor and/or actuator to suppress or ignore the force if detected as being below a threshold force and/or is applied for less than a threshold duration, wherein the threshold force and/or duration correspond to an involuntary movement.

13. The mobility assistance device according to claim 1 wherein the control unit is configured to determine the position of the proximal and/or distal arms with respect to the vertical based on data from a sensor, and in response to the sensed data, to either suppress or propagate the movement of a user by adjusting the position of the counterweight, adjusting an angle a between the proximal and distal arms, adjusting a stiffness in one or more frame joints, adjusting the speed and/or direction of the self-balancing wheels, and/or adjusting the stiffness of a connector.

14. The mobility assistance device according to claim 1 wherein the control unit is configured to interpret sensed data to determine whether a user's movement is voluntary and to propagate only voluntary movements.

15. The mobility assistance device according to claim 1 comprising a step of propagating an intentional movement of a user by means of the device, while providing at least partial body weight support.

16. The mobility assistance device of claim 2 wherein the height $h_o$ is between 0.3-1.2 m and a height difference $\Delta h$ between the first and second axes is at least 0.25 m.

17. The mobility assistance device according to claim 2 wherein the shift between the axes is adjustable by means of a slot in which the first axis is housed.

18. The mobility assistance device according to claim 8 wherein $L_1$ may be varied by at least +/−1 cm.

19. The mobility assistance device according to claim 11 wherein the ball joints comprise a slot configured to accommodate a change of distance between the left and right members.

20. The mobility assistance device according to claim 14 wherein the degree of propagation and/or suppression of the user's movement is adjustable.

* * * * *